US012739594B2

(12) United States Patent
Hwang et al.

(10) Patent No.: US 12,739,594 B2
(45) Date of Patent: Sep. 15, 2026

(54) METHOD BY WHICH FIRST SERVER TRANSMITS SERVER MESSAGE TO SECOND SERVER IN WIRELESS COMMUNICATION SYSTEM, AND APPARATUS THEREFOR

(71) Applicant: LG Electronics Inc., Seoul (KR)

(72) Inventors: Jaeho Hwang, Seoul (KR); Hakseong Kim, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 375 days.

(21) Appl. No.: 18/684,476

(22) PCT Filed: Aug. 19, 2022

(86) PCT No.: PCT/KR2022/012440
§ 371 (c)(1),
(2) Date: Feb. 16, 2024

(87) PCT Pub. No.: WO2023/022571
PCT Pub. Date: Feb. 23, 2023

(65) Prior Publication Data

US 2025/0031011 A1 Jan. 23, 2025

(30) Foreign Application Priority Data

Aug. 19, 2021 (KR) ........................ 10-2021-0109678

(51) Int. Cl.
*H04W 4/02* (2018.01)
*H04W 4/08* (2009.01)
*H04W 4/44* (2018.01)

(52) U.S. Cl.
CPC ............. *H04W 4/023* (2013.01); *H04W 4/08* (2013.01); *H04W 4/44* (2018.02)

(58) Field of Classification Search
CPC ......... H04W 4/44; H04W 4/023; H04W 4/08; H04W 4/46
See application file for complete search history.

(56) References Cited

U.S. PATENT DOCUMENTS

2019/0387564 A1 12/2019 Kim
2020/0351736 A1 11/2020 Sun
(Continued)

FOREIGN PATENT DOCUMENTS

EP 3716679 A1 9/2020
WO WO 2020/200686 10/2020
WO WO 2020/231309 11/2020

OTHER PUBLICATIONS

Ericsson, "Direct use of <V2X-UE-id> element," C1-206666, 3GPP TSG-CT WG1 Meeting #126-e, Electronic meeting, Oct. 15-23, 2020, 16 pages.
(Continued)

*Primary Examiner* — Margaret G Webb
(74) *Attorney, Agent, or Firm* — Fish & Richardson P.C.

(57) ABSTRACT

According to an aspect of various embodiments, disclosed are a method by which a first server transmits a server message to a second server in a wireless communication system, and an apparatus therefor. Disclosed are a method and an apparatus therefor, the method comprising the steps of: receiving, from a first terminal, a first message including position information about the first terminal; transmitting, to terminals, the first message of which a first group is changed to a reception group; and transmitting a server message to a second server through a first connection.

16 Claims, 21 Drawing Sheets

(56) References Cited

U.S. PATENT DOCUMENTS

| | | | | |
|---|---|---|---|---|
| 2021/0111953 | A1* | 4/2021 | Hall | H04W 48/14 |
| 2021/0168573 | A1* | 6/2021 | Zhao | H04L 41/0806 |
| 2021/0250739 | A1 | 8/2021 | Essaili et al. | |
| 2023/0188964 | A1* | 6/2023 | Pateromichelakis | H04L 67/34 709/218 |
| 2023/0379675 | A1* | 11/2023 | Zhang | H04W 4/46 |
| 2024/0380848 | A1* | 11/2024 | Wang | H04M 15/66 |

OTHER PUBLICATIONS

Extended European Search Report in European Appln. No. 22858808.3, mailed on Jun. 27, 2025, 9 pages.

International Search Report and Written Opinion in Appln. No. PCT/KR2022/012440, mailed on Dec. 13, 2022, 13 pages (with English translation).

* cited by examiner (a)

(b)

| index | Zone | Road |
|---|---|---|
| 1 | Zone 1 | 2000 |
| 2 | Zone 2 | 2000 |
| 3 | Zone 3 | 2001 |
| 4 | Zone 4 | 2001 |

METHOD BY WHICH FIRST SERVER TRANSMITS SERVER MESSAGE TO SECOND SERVER IN WIRELESS COMMUNICATION SYSTEM, AND APPARATUS THEREFOR

CROSS-REFERENCE TO RELATED APPLICATIONS

This application is a National Stage application under 35 U.S.C. § 371 of International Application No. PCT/KR2022/012440, filed on Aug. 19, 2022, which claims the benefit of Korean Application No. 10-2021-0109678, filed on Aug. 19, 2021. The disclosures of the prior applications are incorporated by reference in their entirety.

TECHNICAL FIELD

The present disclosure relates to a method by which a first server transmits a server message to a second server in a wireless communication system and apparatus therefor.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Problem

The present disclosure aims to provide a method and apparatus for efficiently sharing information and messages about user equipments (UEs) between servers based on different vehicle-to-network (V2N) platforms by defining a message format and a group interchange method in common between a first server and a second server that support different message formats and different group configuration methods.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

Technical Solution

In an aspect of the present disclosure, provided herein is a method of transmitting, by a first server, a message to a second server in a wireless communication system. The method may include: receiving a first message including location information on a first user equipment (UE) from the first UE; transmitting the first message for which reception group is set to a first group to UEs; and transmitting the server message to the second server through a first connection. The first connection may be established based on a response message received from the second server in response to transmission of a connection request message including conversion type information to the second server. Based on the conversion type information is a transmission conversion type, the first server may: convert the first group to a second group based on group type information included in the response message and transmit the server message including a second message for which reception group is converted to the second group through the first connection.

Alternatively, the second message may be converted from the first message based on transmission parameters for the second server included in the response message.

Alternatively, the group type information may include information one of: a first type for configuring a group based on a tile-shaped zone related to the location information; a second type for configuring a group based on a road related to the location information; and a third type for configuring a group based on a UE identifier (ID) related to the UE.

Alternatively, based on that the first group is configured based on the first type and that the group type information is the second type, the second group may be configured on a first road mapped to a first zone related to the first group according to a mapping table between the zone and the road.

Alternatively, based on that the first group is configured based on the third type and that the group type information is the second type, the second group may be configured on a first road related to a location of the UE based on the location information on the UE and road information obtained in advance for the second type.

Alternatively, the reception group for the second message may be set to the second group by registering or changing a topic related to the second group in the first connection based on a message queuing telemetry transport (MQTT) protocol.

Alternatively, the reception group for the second message may be set to the second group through the first connection. The first connection may be a transmission control protocol/Internet protocol (TCP/IP) connection established based on socket connection information on UEs included in the second group.

Alternatively, the conversion type information may include information on any one of the transmission conversion type, a reception conversion type, and an integrated conversion type.

Alternatively, based on that the conversion type information is the reception conversion type, the server message may include the first message that is not converted.

Alternatively, the method may further include, based on that the conversion type information is the reception conversion type, receiving a message requesting additional information required to configure a message related to the second server from the second server.

Alternatively, based on that the conversion type information is the integrated conversion type, the server message may include an integrated message converted from the first message based on integrated parameters in common between the first server and the second server.

In another aspect of the present disclosure, provided herein is a method of receiving, by a second server, a server message from a first server in a wireless communication system. The method may include: receiving a second message including location information on a second UE from the second UE; transmitting the second message for which reception group is set to a second group to UEs; and receiving a server message from the first server through a first connection. The first connection may be established based on transmission of a response message in response to a connection request message including conversion type information received from the first server. Based on the conversion type information is a transmission conversion type, a reception group for the server message may be converted to the second group related to group type information included in the response message through the first connection.

Alternatively, the method may further include, based on the conversion type information is a reception conversion type; obtaining a first message included in the server message, wherein the first message is received by the first server from a first UE; and converting the first message to the second message.

Alternatively, the method may further include, based on that the first message does not include first information for the conversion to the second message, transmitting a request message to request the first information. Based on that the first information or part of the first information is not included in a request response message in response to the request message, the second server may receive a collective perception service (CPS) message or a collective perception message (CPM) and obtain the first information or the part of the first information from object matching based on the CPS or the CPM.

In another aspect of the present disclosure, provided herein is a first server configured to transmit a server message to a second server in a wireless communication system. The first server may include: a radio frequency (RF) transceiver; and a processor connected to the RF transceiver. The processor may be configured to control the RF transceiver to: receive a first message including location information on a first UE from the first UE; transmit the first message for which reception group is set to a first group to UEs; and transmit the server message to the second server through a first connection. The first connection may be established based on a response message received in response to transmission of a connection request message including conversion type information to the second server. Based on the conversion type information is a transmission conversion type, the processor may be configured to: convert the first group to a second group based on group type information included in the response message; and transmit the server message including a second message for which reception group is converted to the second group through the first connection.

In another aspect of the present disclosure, provided herein is a second server configured to receive a server message from a first server in a wireless communication system. The second server may include: an RF transceiver; and a processor connected to the RF transceiver. The processor may be configured to control the RF transceiver to: receive a second message including location information on a second UE from the second UE; transmit the second message for which reception group is set to a second group to UEs; and receive the server message from the first server through a first connection. The first connection may be established based on transmission of a response message in response to a connection request message including conversion type information received from the first server. Based on the conversion type information is a transmission conversion type, a reception group for the server message may be converted to the second group related to group type information included in the response message through the first connection.

In another aspect of the present disclosure, provided herein is a chipset configured to transmit a server message to a second server in a wireless communication system. The chipset may include: at least one processor; and at least one memory operably connected to the at least one processor and configured to, when executed, cause the at least one processor to perform operations. The operations may include: receiving a first message including location information on a first UE from the first UE; transmitting the first message for which reception group is set to a first group to UEs; establishing a first connection based on a response message received in response to transmission of a connection request message including conversion type information to the second server; converting the first group to a second group based on group type information included in the response message; and transmitting the server message including a second message for which reception group is converted to the second group through the first connection.

In a further aspect of the present disclosure, provided herein is a computer-readable storage medium including at least one computer program configured to cause a second server to perform operations of transmitting a server message in a wireless communication system. The computer-readable storage medium may include the at least one computer program. The at least one computer program may be stored on the computer-readable storage medium. The operations may include: receiving a first message including location information on a first UE from the first UE; transmitting the first message for which reception group is set to a first group to UEs; establishing a first connection based on a response message received in response to transmission of a connection request message including conversion type information to the second server; converting the first group to a second group based on group type information included in the response message; and transmitting the server message including a second message for which reception group is converted to the second group through the first connection.

Advantageous Effects

According to various embodiments, regarding the conversion of messages about user equipments (UEs) interchanged between servers, a transmission conversion type, reception conversion type, and integrated conversion type may be newly defined, thereby facilitating an agreement in message and group transformation types between first and second servers that support different message formats and group configuration methods. Based on this agreement, servers based on different vehicle-to-network (V2N) platforms may efficiently share information and messages about UEs.

Specifically, the first server may agree in advance based on conversion type information whether to convert a received UE message into a message format related to the parameters of the second server, thereby effectively resolving the differences in V2N platforms between the first and second servers.

For the transmission conversion type, the first server may convert a reception group for the received UE message based on a group configuration method related to the parameters of the second server, thereby significantly reducing the overhead on the second server due to the group conversion of the UE message.

For the reception conversion type, the second server may request in advance the first server to transmit information necessary for configuring a message thereof in an additional data request message, thereby effectively and promptly configuring the message based on the UE message.

Additionally, for the transmission conversion type, the first server may quickly perform group conversion into a group for the second server based on a mapping table between zones based on the zone-based group configuration method and roads based on the road-based group configuration method.

Effects to be achieved by embodiment(s) are not limited to what has been particularly described hereinabove and other effects not mentioned herein will be more clearly understood by persons skilled in the art to which embodiment(s) pertain from the following detailed description.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION

Figure 1:
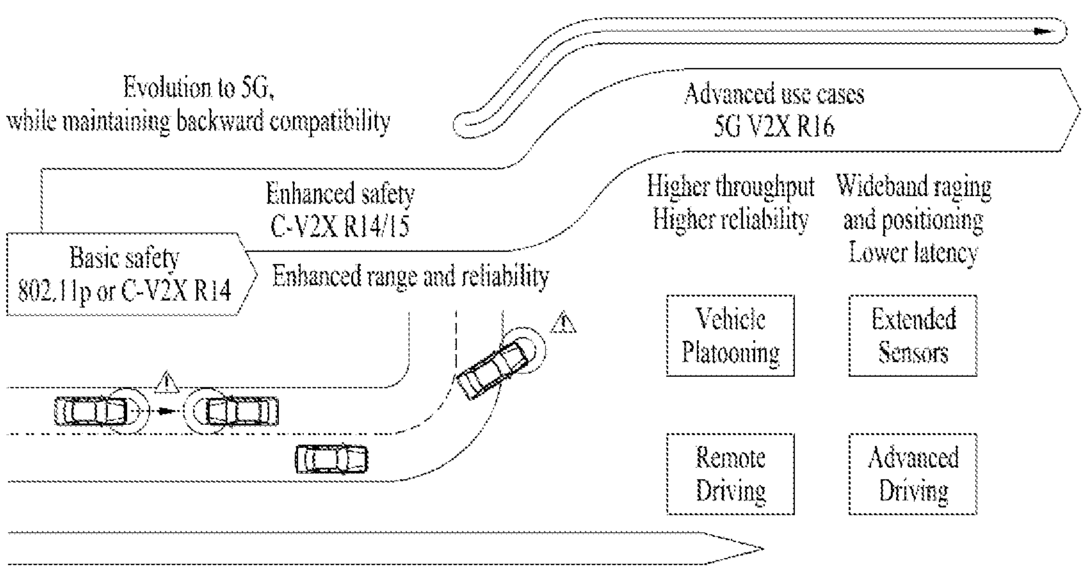
FIG. 1 is a diagram for explaining by comparing vehicle-to-everything (V2X) communication based on radio access technology (RAT) before New Radio (NR) and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE).

OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro. [0070] 5G NR is a successor technology of LTE-A and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
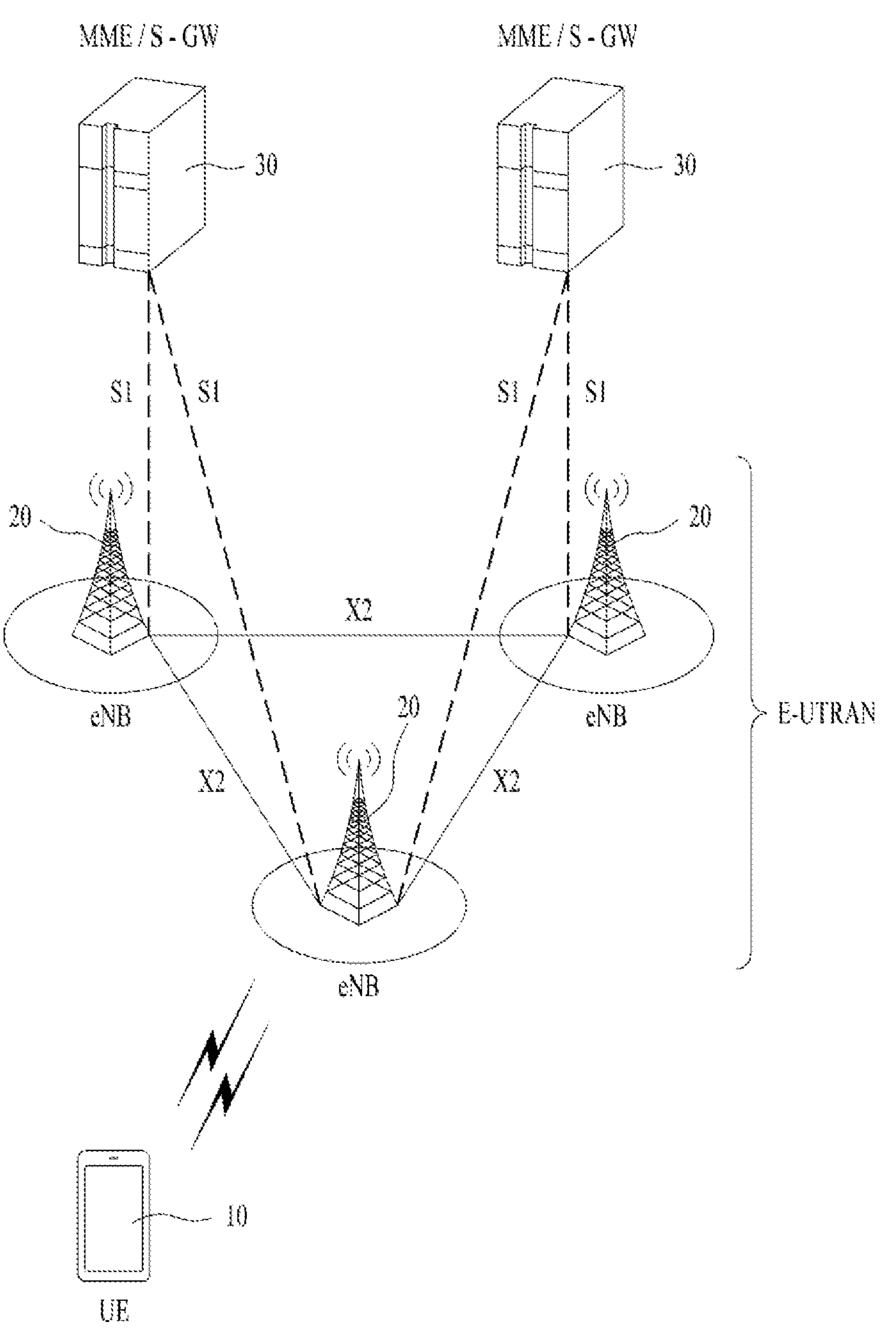
FIG. 2 illustrates the structure of a Long-Term Evolution (LTE) system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2)

and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
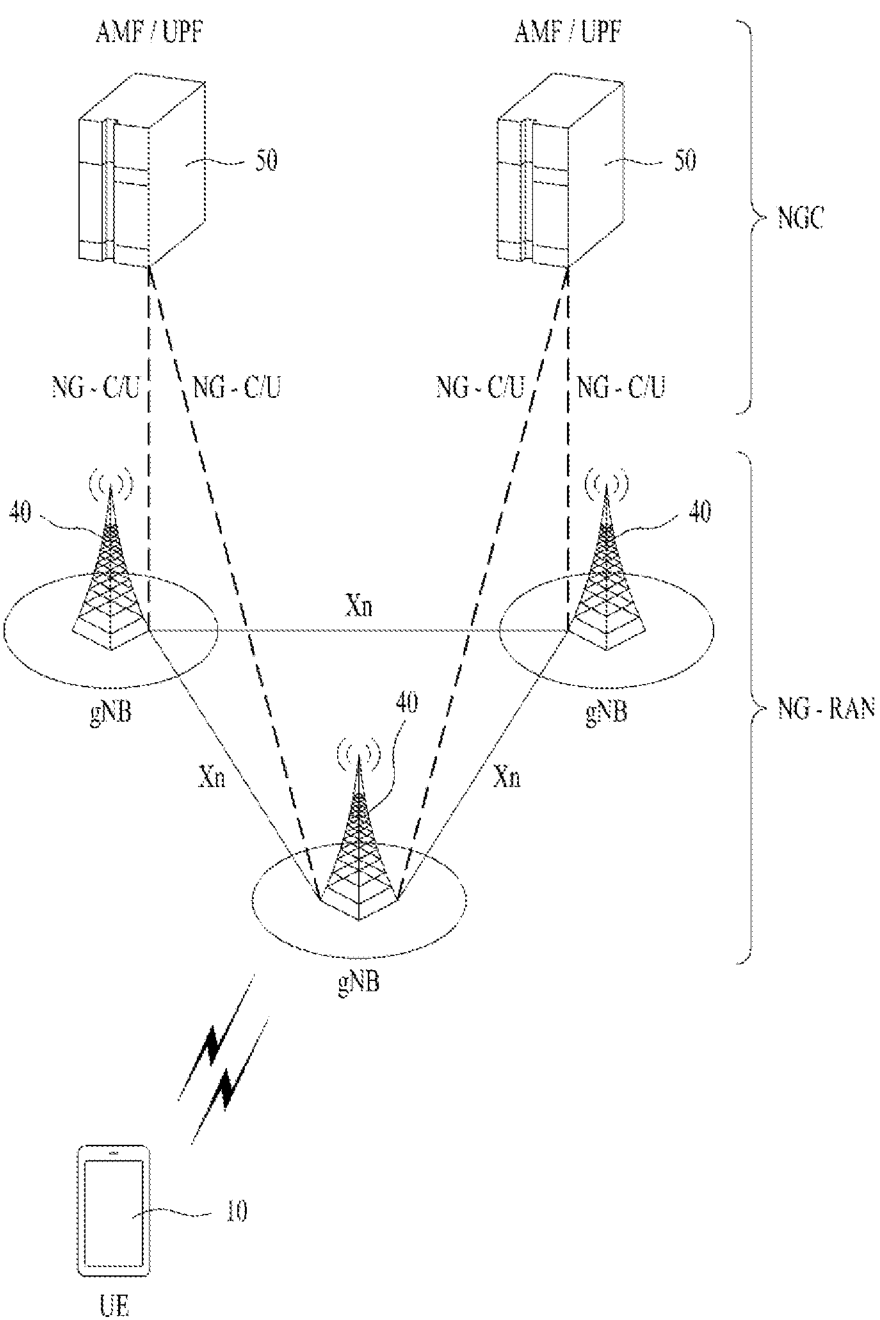
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
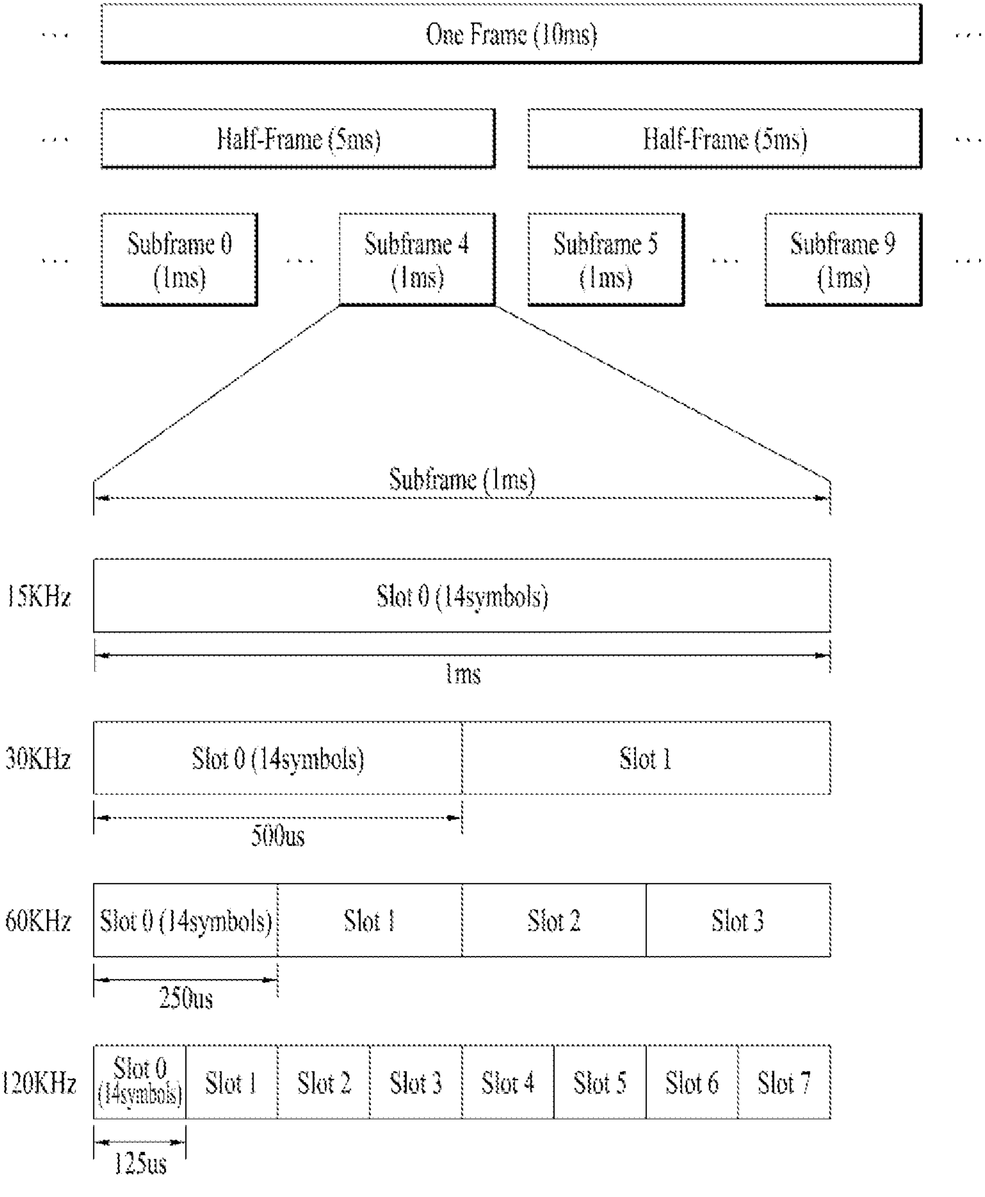
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15*2u) | $N^{slot}_{symb}$ | $N^{frame,u}_{slot}$ | $N^{subframe,u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
|---|---|---|---|
| 60 kHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
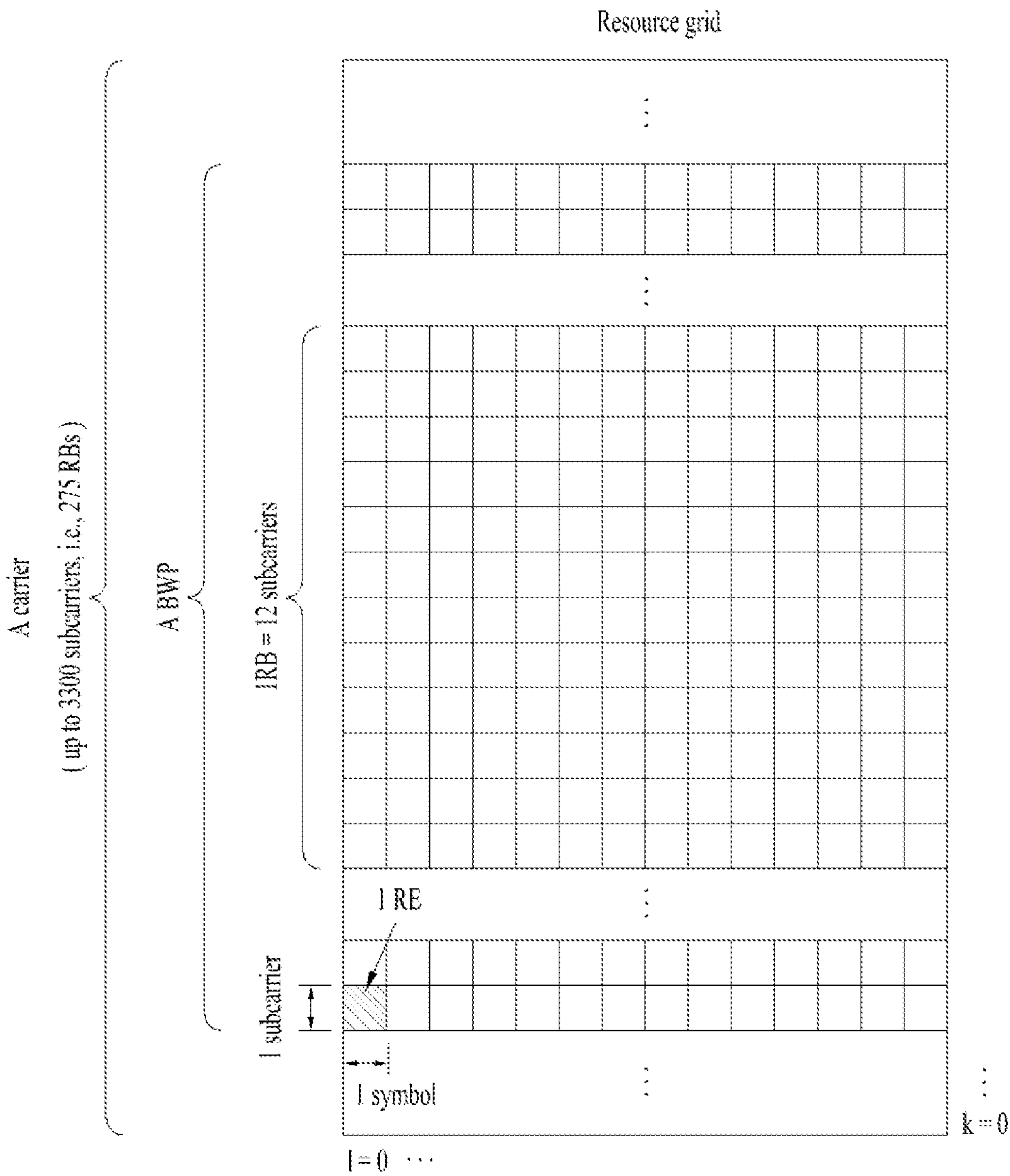
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
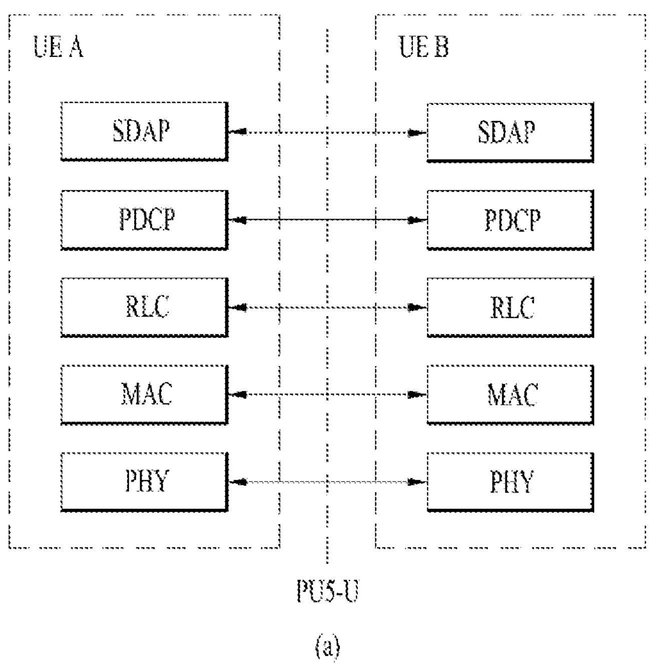
FIG. 6 illustrates a radio protocol architecture for SL communication.
Figure 6:
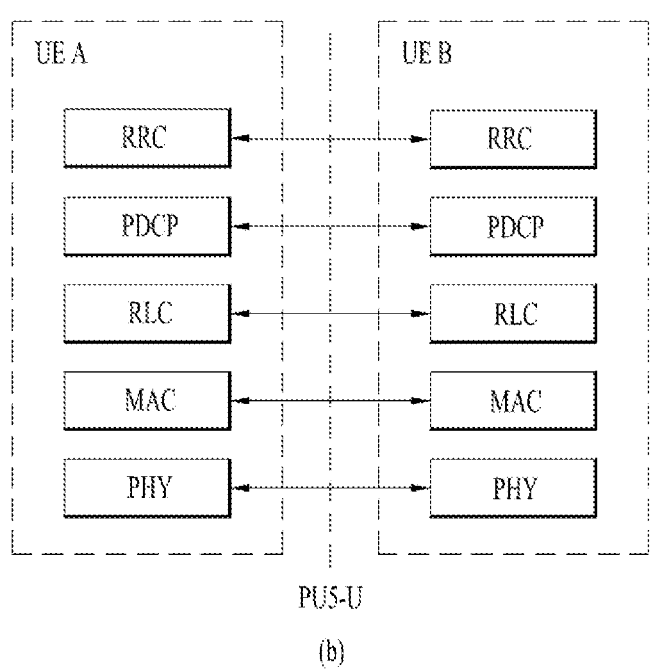

FIG. 6 illustrates a radio protocol architecture for SL communication. Specifically, FIG. 6-(*a*) shows a user plane protocol stack of NR, and FIG. 6-(*b*) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs).

For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be preconfigured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type.

For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
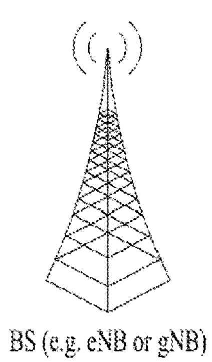
FIG. 7 illustrates user equipments (UEs) performing V2X or sidelink (SL) communication.
Figure 7:
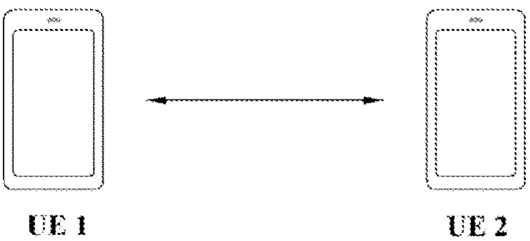

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
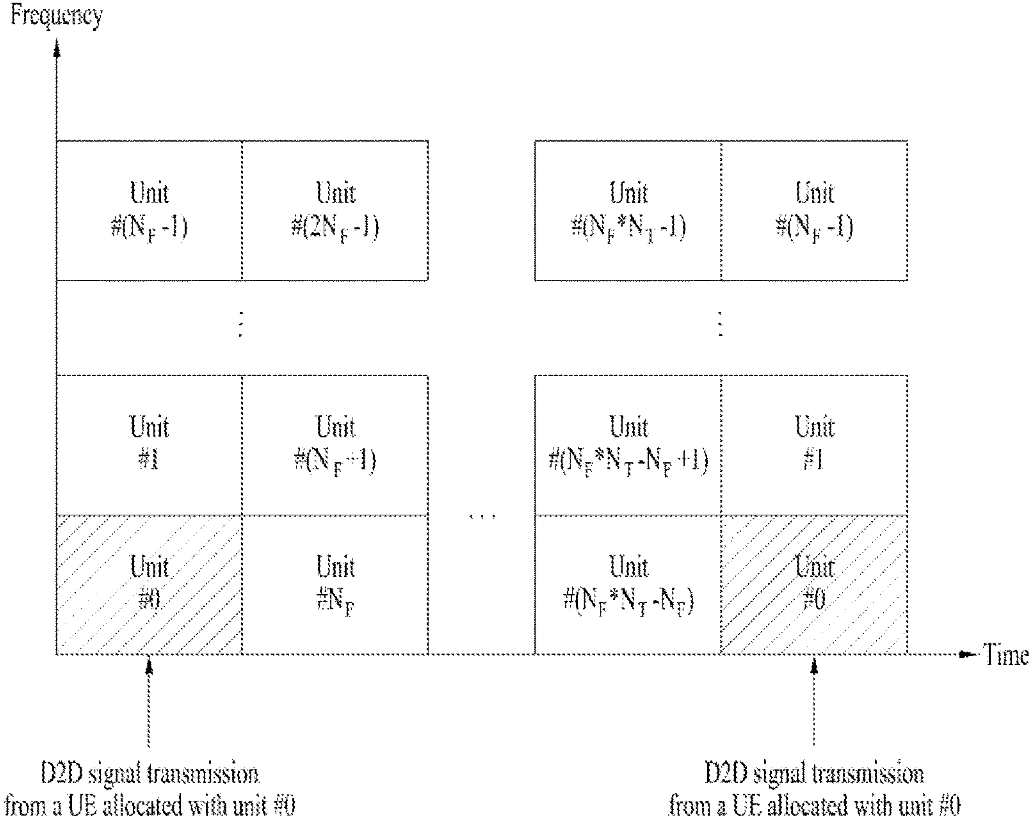
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Vehicular Communications for ITS

An intelligent transport system (ITS) utilizing vehicle-to-everything (V2X) may mainly include an access layer, a network & transport layer, a facilities layer, an application layer, security and management entities, etc. Vehicle communication may be applied to various scenarios such as vehicle-to-vehicle communication (V2V), vehicle-to-network communication (V2N or N2V), vehicle-to-road side unit (RSU) communication (V2I or I2V), RSU-to-RSU communication (I2I), vehicle-to-pedestrian communication (V2P or P2V), and RSU-to-pedestrian communication (I2P or P2I). A vehicle, a BS, an RSU, a pedestrian, etc. as the subjects of vehicle communication are referred to as intelligent transport system (ITS) stations.

Figure 9:
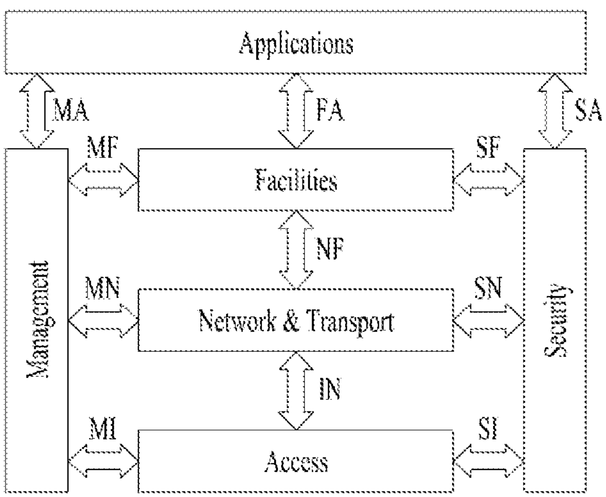
FIG. 9 is a diagram for explaining an intelligent transport system (ITS) station reference architecture.

FIG. 9 is a diagram for explaining an intelligent transport system (ITS) station reference architecture.

The ITS station reference architecture may include an access layer, a network & transport layer, a facilities layer, entities for security and management, and an application layer at the top. Basically, the ITS station reference architecture follows a layered OSI model.

Specifically, features of the ITS station reference architecture based on the OSI model are illustrated in FIG. 9. The access layer of the ITS station corresponds to OSI layer 1 (physical layer) and layer 2 (data link layer), the network & transport layer of the ITS station corresponds to OSI layer 3 (network layer) and layer 4 (transport layer), and the facilities layer of the ITS station corresponds to OSI layer 5 (session layer), layer 6 (presentation layer), and layer 7 (application layer).

The application layer, which is located at the highest layer of the ITS station, may actually implement and support a use-case and may be selectively used according to the use-case. The management entity serves to manage all layers in addition to managing communication and operations of the ITS station. The security entity provides security services for all layers.

Each layer of the ITS station exchanges data transmitted or received through vehicle communication and additional information for various purposes through an interface. The abbreviations of various interfaces are described below.

MA: Interface between management entity and application layer

MF: Interface between management entity and facilities layer

MN: Interface between management entity and networking & transport layer

MI: Interface between management entity and access layer

FA: Interface between facilities layer and ITS-S applications

NF: Interface between networking & transport layer and facilities layer

IN: Interface between access layer and networking & transport layer

SA: Interface between security entity and ITS-S applications

SF: Interface between security entity and facilities layer

SN: Interface between security entity and networking & transport layer

SI: Interface between security entity and access layer

Figure 10:
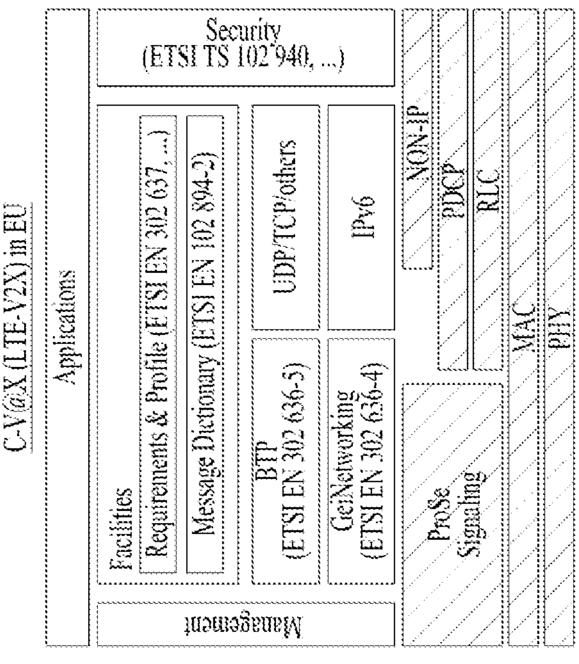
FIG. 10 illustrates an exemplary structure of an ITS station that may be designed and applied based on a reference architecture.

FIG. 10 illustrates an exemplary structure of an ITS station that may be designed and applied based on a reference architecture.

A main concept of the ITS station reference architecture is to allow each layer with a special function to process communication on a layer basis, between two end vehicles/users included in a communication network. That is, when a V2V message is generated, the data is passed through each layer downwards layer by layer in the vehicle and the ITS system (or other ITS-related UEs/systems), and a vehicle or ITS system (or other ITS-related UEs/systems) receiving the message passes the message upwards layer by layer.

The ITS system operating through vehicle communication and the network was organically designed in consideration of various access technologies, network protocols, communication interfaces, etc. to support various use-cases, and the roles and functions of each layer described below may be changed depending on a situation. The main functions of each layer will be briefly described.

The application later actually implements and supports various use-cases. For example, the application layer provides security, efficient traffic information, and other entertainment information.

The application layer controls an ITS station to which an application belongs in various manners or provides services by transferring a service message to an end vehicle/user/infrastructure through the access layer, the network & transport layer, and the facilities layer, which are lower layers of the application layer, by vehicle communication. In this case, the ITS application may support various use-cases. In general, these use-cases may be supported by grouping into other applications such as road-safety, traffic efficiency, local services, and infotainment. Application classification, use-cases, etc. may be updated when a new application scenario is defined. Layer management serves to manage and service information related to operation and security of the application layer, and the related information is transmitted and shared bidirectionally through an MA and an SA (or service access point (SAP), e.g., MA-SAP or SA-SAP). A request from the application layer to the facilities layer or a service message and related information from the facilities layer to the application layer may be delivered through an FA.

The facilities layer serves to support effective implementation of various use-cases defined in an application layer of a higher layer. For example, the facilities layer may perform application support, information support, and session/communication support.

The facilities layer basically supports the 3 higher layers of the OSI model, for example, a session layer, a presentation layer, and the application layer, and functions. Specifically, the facilities layer provides facilities such as application support, information support, and session/communication support, for the ITS. Here, the facilities mean components that provide functionality, information, and data.

The application support facilities support the operation of ITS applications (mainly generation of a message for the ITS, transmission and reception of the message to and from a lower layer, and management of the message). The application support facilities include a cooperative awareness (CA) basic service and a decentralized environmental notification (DEN) basic service. In the future, facilities entities for new services such as cooperative adaptive cruise control (CACC), platooning, a vulnerable roadside user (VRU), and a collective perception service (CPS), and related messages may be additionally defined.

The information support facilities provide common data information or a database to be used by various ITS applications and includes a local dynamic map (LDM).

The session/communication support facilities provide services for communications and session management and include an addressing mode and session support.

Facilities may be divided into common facilities and domain facilities.

The common facilities are facilities that provide common services or functions required for various ITS applications and ITS station operations, such as time management, position management, and service management.

The domain facilities are facilities that provide special services or functions required only for some (one or more) ITS applications, such as a DEN basic service for road hazard warning applications (RHW). The domain facilities are optional functions and are not used unless supported by the ITS station.

Layer management serves to manage and service information related to the operation and security of the facilities layer, and the related information is transmitted and shared bidirectionally through an MF and an SF (or MF-SAP and SF-SAP). The transfer of service messages and related information from the application layer to the facilities layer or from the facilities layer to the application layer is performed through an FA (or FA-SAP), and bidirectional service messages and related information between the facilities layer and the lower networking & transport layer are transmitted by an NF (or NF-SAP).

The network & transport layer servers to configure a network for vehicle communication between homogenous or heterogeneous networks through support of various transport protocols and network protocols. For example, the network & transport layer may provide Internet access, routing, and vehicle networking using Internet protocols such as TCP/UDP+IPv6 and form a vehicle network using a basic transport protocol (BTP) and GeoNetworking-based protocols. In this case, networking using geographic position information may also be supported. A vehicle network layer may be designed or configured depending on technology used for the access layer (access layer technology-independently) or regardless of the technology used for the access layer (access layer technology-independently or access layer technology agnostically).

Functionalities of the European ITS network & transport layer are as follows. Basically, functionalities of the ITS network & transport layer are similar to or identical to those of OSI layer 3 (network layer) and layer 4 (transport layer) and have the following characteristics.

Figure 11:
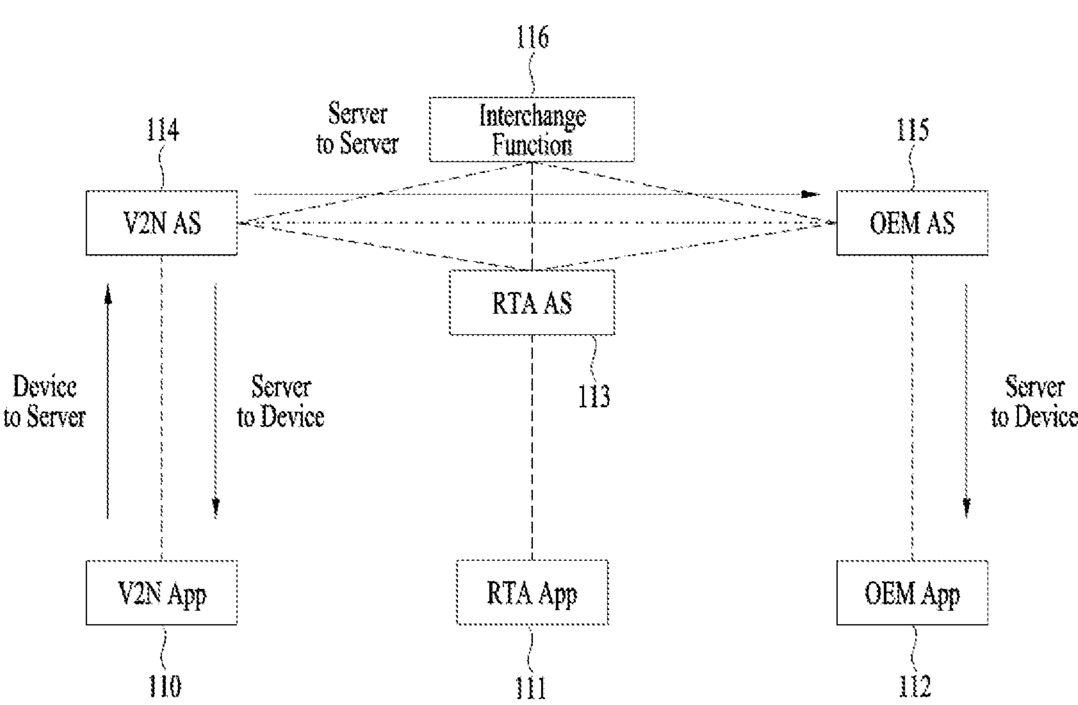
FIG. 11 illustrates a vehicle-to-network (V2N) system for ensuring the safety of UEs between different service platforms.

The transport layer is a connection layer that delivers service messages and related information received from higher layers (the session layer, the presentation layer, and the application layer) and lower layers (the network layer, the data link layer, and the physical layer). The transport layer serves to manage data transmitted by an application of the ITS station so that the data accurately arrives at an application process of the ITS station as a destination. Transport protocols that may be considered in European ITS include, for example, TCP and UDP used as legacy Internet protocols as illustrated in FIG. 11, and there are transport protocols only for the ITS, such as the BTS.

The network layer serves to determine a logical address and a packet forwarding method/path and add information such as the logical address of a destination and the forwarding path/method to a header of the network layer in a packet received from the transport layer. As an example of the packet method, unicast, broadcast, and multicast between ITS stations may be considered. Various networking protocols for the ITS may be considered, such as GeoNetworking, IPv6 networking with mobility support, and IPv6 over GeoNetworking. In addition to simple packet transmission, the GeoNetworking protocol may apply various forwarding paths or transmission ranges, such as forwarding using position information about stations including vehicles or forwarding using the number of forwarding hops.

Layer management related to the network & transport layer serves to manage and provide information related to the operation and security of the network & transport layer, and the related information is transmitted and shared bidirectionally through an MN (or MN-SAP) and an SN (or SN-SAP). Transmission of bidirectional service messages and related information between the facilities layer and the networking & transport layer is performed by an NF (or NF-SAP), and service messages and related information between the networking & transport layer and the access layer are exchanged by an IN (or IN-SAP).

A North American ITS network & transport layer supports IPv6 and TCP/UDP to support existing IP data like Europe, and a wave short message protocol (WSMP) is defined as a protocol only for the ITS.

A packet structure of a wave short message (WSM) generated according to the WSMP includes a WSMP header and WSM data carrying a message. The WSMP header includes Version, PSID, WSMP header extension fields, WSM WAVE element ID, and Length.

Version is defined by a WsmpVersion field indicating an actual WSMP version of 4 bits and a reserved field of 4 bits. PSID is a provider service identifier, which is allocated according to an application in a higher layer and helps a receiver to determine an appropriate higher layer. Extension fields is a field for extending the WSMP header, and includes information such as a channel number, a data rate, and transmit power used. WSMP WAVE element ID specifies the type of a WSM to be transmitted. Length specifies the length of transmitted WSM data in octets through a WSMLength field of 12 bits, and the remaining 4 bits are reserved. LLC Header allows IP data and WSMP data to be transmitted separately and is distinguished by Ethertype of a SNAP. The structures of the LLC header and the SNAP header are defined in IEEE802.2. When IP data is transmitted, Ethertype is set to 0x86DD in the LLC header. When WSMP is transmitted, Ethertype is set to 0x88DC in the LLC header. The receiver identifies Ethertype. If Ethertype is 0x86DD, the receiver transmits upward the packet to an IP data path, and if Ethertype is 0x88DC, the receiver transmits upward the packet to a WSMP path.

The access layer serves to transmit a message or data received from a higher layer on a physical channel. As access layer technologies, ITS-G5 vehicle communication technology based on IEEE 802.11p, satellite/broadband wireless mobile communication technology, 2G/3G/4G (long-term evolution (LTE), etc.)/5G wireless cellular communication technology, cellular-V2X vehicle-dedicated communication technologies such as LTE-V2X and NR-V2X (new radio), broadband terrestrial digital broadcasting technology such as DVB-T/T2/ATSC3.0, and GPS technology may be applied.

A data link layer is a layer that converts a physical line between adjacent nodes (or between vehicles) with noise into a communication channel without transmission error, for use in the higher network layer. The data link layer performs a function of transmitting/delivering/forwarding L3 protocols, a framing function of dividing data to be transmitted into packets (or frames) as transmission units and grouping the packets, a flow control function of compensating for a speed difference between a transmitter and a receiver, and a function of (because there is a high probability that an error and noise occurs randomly in view of the nature of a physical transmission medium) detecting a transmission error and correcting the error or detecting a transmission error based on a timer and an ACK signal by a transmitter in a method such as automatic repeat request (ACK) and retransmitting a packet that has not been correctly received. In addition, to avoid confusion between packets or ACK signals, the data link layer performs a function of assigning a sequence number to the packets and the ACK signals, and a function of controlling establishment, maintenance, and disconnection of a data link between network entities, and data transmission between network entities. The main functions of logical link control (LLC), radio resource control (RRC), packet data convergence protocol (PDCP), radio link control (RLC), medium access control (MAC), and multi-channel operation (MCO) included in the data link layer of FIG. 11 will be described below.

An LLC sub-layer enables the use of different lower MAC sub-layer protocols, and thus enables communication regardless of network topology. An RRC sub-layer performs functions such as broadcasting of cell system information required for all UEs within a cell, management of delivery of paging messages, management (setup/maintenance/release) of RRC connection between a UE and an E-UTRAN, mobility management (handover), transmission of UE context between eNodeBs during handover, UE measurement reporting and control therefor, UE capability management, temporary assignment of a cell ID to a UE, security management including key management, and RRC message encryption. A PDCP sub-layer may performs functions such as IP packet header compression in a compression method such as robust header compression (ROHC), cyphering of a control message and user data, data integrity, and data loss prevention during handover. RLC sub-layer delivers a packet received from the higher PDCP layer in an allowed size of the MAC layer through packet segmentation/concatenation, increases data transmission reliability by transmission error and retransmission management, checks the order of received data, reorders data, and checks redundancy. A MAC sub-layer performs functions such as control of the occurrence of collision/contention between nodes for use of shared media among multiple nodes, matching a packet delivered from the higher layer to a physical layer frame format, assignment and identification of the address of the transmitter/receiver, detection of a carrier, collision detection, and detection of obstacles on the physical medium. An MCO sub-layer enables efficient provision of various services on a plurality of frequency channels. The main function of MCO sub-layer is to effectively distribute traffic load of a specific frequency channel to other channels to minimize collision/contention of communication information between vehicles in each frequency channel.

The physical layer is the lowest layer in the ITS layer architecture. The physical layer defines an interface between a node and a transmission medium and performs modulation, coding, and mapping of a transport channel to a physical channel, for bit transmission between data link layer entities and informs the MAC sub-layer of whether a wireless medium is busy or idle by carrier sensing or clear channel assessment (CCA).

A soft V2X system may be a system in which a soft V2X server receives a VRU message or a personal safety message (PSM) from a vulnerable road user (VRU) or a V2X vehicle and transfers information on a neighbor VRU or vehicle based on the VRU message or the PSM message or may analyze a road condition, etc. on which neighbor VRUs or vehicles move and may transmit a message informing a neighbor VRU or vehicle of a collision warning, etc. based on the analyzed information (e.g., through a downlink signal) via V2X communication using a UU interface. Here, the VRU message may be a message transmitted to the soft V2X server through the UU interface, and may include mobility information about the VRU, such as a position, a movement direction, a movement path, and a speed of the VRU. That is, the soft V2X system may use a method of receiving mobility information of VRUs and/or vehicles related to V2X communication through the UU interface and controlling a driving route or a VRU movement flow of the VRU, etc. based on the mobility information received by the softV2X server, such as a network. The soft V2X system may be configured in relation to V2N communication.

User equipment or pedestrian equipment (VRU device) that is difficult to perform direct communication (PC5, DSRC) related to V2X communication can provide or receive driving information and mobility information to nearby vehicles or VRUs through the soft V2X system based on the UU interface. Through this, the user equipment or pedestrian equipment (VRU device) that is difficult to perform the direct communication (PC5, DSRC) can be protected from surrounding vehicles.

Interchange Operation for Multiple V2N Platform Connections

A UE and a vehicle including the UE may ensure safety in V2X by sharing vehicle information standardized by short-range communication standards. However, due to issues related to V2X frequencies and regulations, the development of such vehicle information sharing methods is being delayed. To address this issue, a method of providing V2N safety services based on smartphones through the Uu interface may be considered. The method of providing V2N safety services is not yet standardized, and thus, service providers may preferentially provide services for ensuring safety based on the above method according to their respective formats. However, this may potentially lead to connectivity issues between service platforms.

Thus, each platform may provide services based on the type or format of the platform. In addition, standardized information may be provided to other service platforms, and operations for increasing the safety of the UE may need to be defined.

FIG. 11 illustrates a V2N system for ensuring the safety of UEs between different service platforms.

Referring to FIG. 11, the proposed V2N system may allow each V2N application server (AS), 114 to manage its ownV2N client UEs. In this case, each V2N platform 114 may share important information about client users (or V2N client UEs) with other neighboring systems (other V2N ASs), thereby improving safety between each other (or safety between the V2N client UEs). The V2N AS should be capable of exchanging information with other V2N ASs. In addition, the V2N AS should also be capable of exchanging information with a road traffic authority (RTA) AS 113, which is responsible for managing the roads, and an original equipment manufacturer (OEM) server 115, which is a vehicle manufacturer, through server messages.

Thus, standardized interfaces and operations need to be defined to enable the ASs 113, 114, and 115 to share data (i.e., information on the V2N client UEs). However, there is a disadvantage that conversion work (e.g., transitioning and transforming to standardized interfaces and operations) is required due to services developed before standardization. Even if a unified interface usable for all ASs is defined, the management of the ASs may be inefficient in that each AS provides different services.

To address this inefficiency, there is a need to propose a new AS system for integrated information interchange among the ASs 113, 114, and 115. Hereinafter, an AS system for integrated information interchange among multiple ASs will be described.

Figure 12:
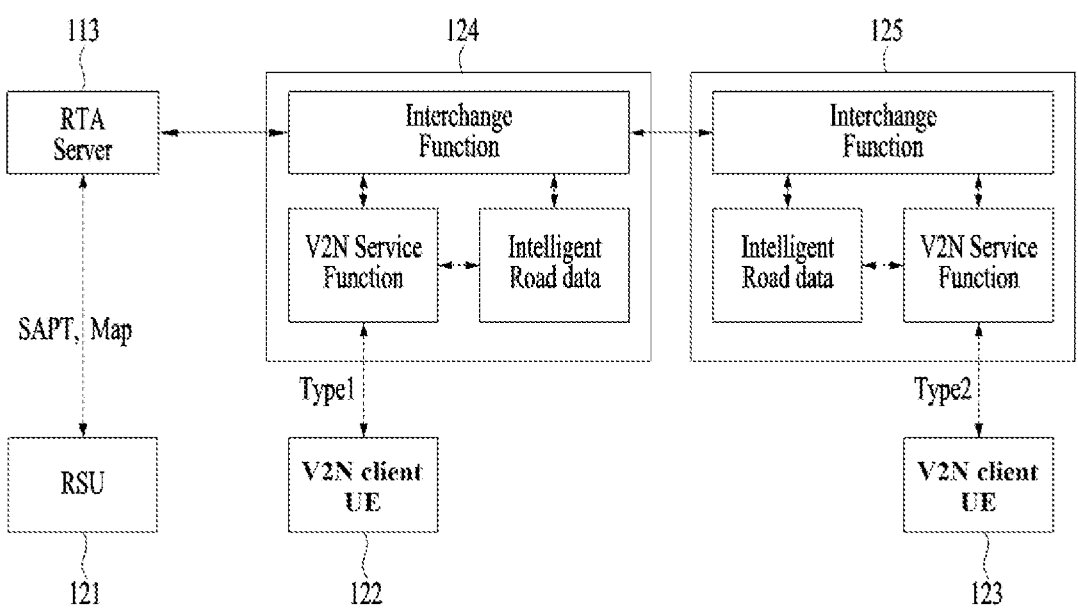
FIG. 12 is a diagram for explaining a message conversion or interchange function operation between servers.

FIG. 12 is a diagram for explaining a message conversion or interchange function operation between servers.

Referring to FIG. 12, each service platform may perform communication based on data suitable for its service purpose according to the communication protocol thereof. For example, a first platform 1 124 may provide services to V2N client UEs 122 based on a communication method corresponding to type 1, and a second platform 125 may provide services to V2N client UEs 123 based on a communication method corresponding to Type 2. The first platform 124 and the second platform 125 need to provide communication in accordance with the interface of an RTA server 113, which is already standardized.

Communication within the platform including the first platform 124 and the second platform 125 as well as communication between platforms may utilize a transmission control protocol/Internet protocol based (TCP/IP-based) network. In this case, due to the characteristics of the broadband-connected communication network, it is necessary to configure and manage a transmission and reception group for client UEs for each platform to provide ITS services that are propagated regionally. Each platform may support communication for each of the selected or formed groups (i.e., transmission and reception groups of client UEs) based on a message queueing telemetry transport (MQTT) protocol and/or a group transmission method based on TCP/IP sockets. For the MQTT, which is used for exchanging messages between devices, it is necessary to preregister messages of interest. The MQTT may have a hierarchical structure of topics, each of which is separated by a slash (/). Once a topic is registered in the MQTT, messages published to the registered topic may be subscribed (by client UEs in a related transmission and reception group). In the TCP/IP socket based method, a reception group may be formed by the server based on the characteristics of each client as in the MQTT described above. Then, sockets may be connected based on the formed reception group. V2X messages for the corresponding reception group may be transmitted based on the socket connection.

As described above, multiple service platforms (e.g., V2N service providers) may use various transmission protocols and/or message types based on various grouping methods to provide various services. Hereinafter, considering the differences in message types and/or grouping types (i.e. grouping methods) between these platforms, interchange function operations between platforms for group and/or message interchange will be described in detail.

Figure 13:
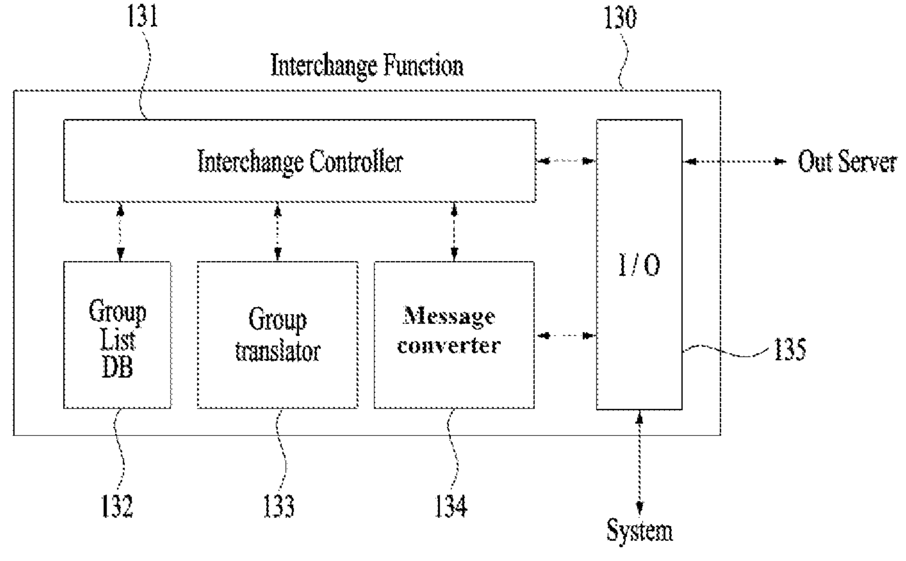
FIG. 13 is a diagram for explaining an interchange function block that performs an information interchange function operation.

FIG. 13 is a diagram for explaining an interchange function block that performs an information interchange function operation.

Referring to FIG. 13, an interchange function block 130 may be connected to an external platform server through an input/output (I/O) block 135. An interchange controller block 131 may analyze the configuration of each server and manage and/or control operations (related to information interchange). A message conversion block 134 may perform encoding and/or decoding based on the encoding type of data that varies for each V2N platform. A group conversion block 133 may perform change the type of the group that receives (transmits) messages (topics in the case of MQTT) for transmission. Alternatively, the group conversion block 133 may convert a message received from the V2N platform into a group message of a type related to the MQTT-based group transmission method described above or a separate TCP/IP socket-based group transmission method. A group list database (DB) block 132 may store information on the conversion of message formats for each platform described above, information on the conversion of group messages, and/or information obtained from the conversion process. For example, the group list DB block 132 may pre-store information on message types for each platform (e.g., message field configurations, message transmission intervals, message encoding methods, etc.) and information on group message types for each platform (e.g., group formation methods such as UE ID-based group messages, zone-based group messages, road ID-based group messages, etc.).

Hereinafter, specific operations for message conversion and/or group conversion between platforms will be described. For convenience of description, the above-described platforms: RTA AS, V2N AS, and OEM servers are be defined as first and second servers (or first and second systems).

FIGS. 14 to 17 are diagrams for explaining operations of exchanging server messages between two servers.

The two servers may receive a first message from the UE. The two servers may include a transmission server (Tx Sever #1) that transmits server messages related to the first message to other servers and a reception server (Rx Sever #2) that receives server messages related to the first message from the transmission server.

The transmission server may transmit a server message including the first message or a second message converted from the first message to the reception server based on message conversion types. Specifically, the message conversion types may include at least one of a transmission conversion (Tx convert) type, a reception conversion (Rx convert) type, and an integrated conversion type. In the case of the transmission conversion type, the transmission server may convert the first message into the second message of a message type related to the reception server. The transmission server may transmit the server message, where the reception group is configured with a group related to the reception server, to the reception server. In the case of the reception conversion type, the transmission server may transmit the server message including the first message to the reception server without converting the first message. The reception server may convert the first message included in the server message into the second message such that the message type corresponds to the message type and group type thereof. In the case of the integrated conversion type, a common type of message exchanged between the transmission server and the reception server may be preconfigured. The transmission server may convert the first message into an integrated message based on common type and then transmit the server message including the integrated message to the reception server. The reception server may convert the integrated message into the second message, which corresponds to its own message type.

Figure 14:
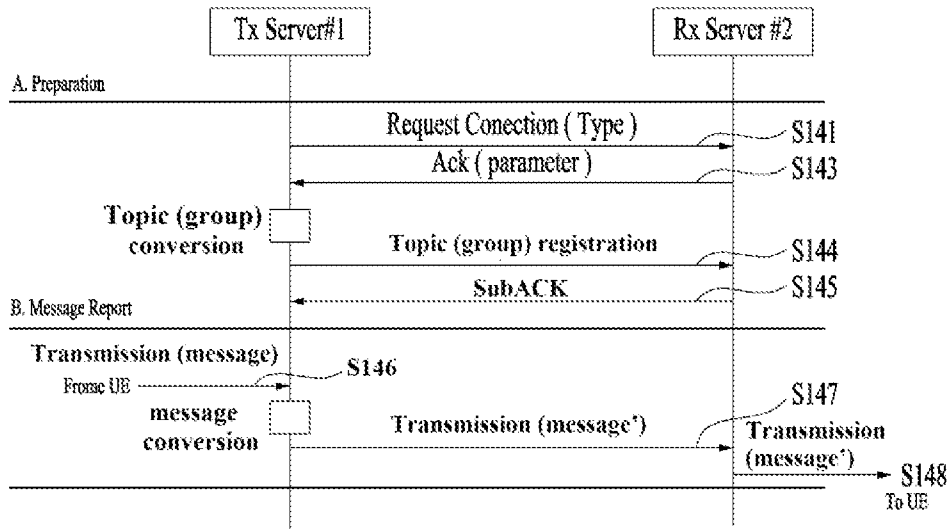
FIGS. 14 to 17 are diagrams for explaining operations of exchanging server messages between two servers.

Specifically, referring to FIG. 14, the transmission server and reception server may perform operations to convert and exchange UE messages based on the transmission conversion (Tx convert) type. The transmission server may transmit a connection request to the reception server to provide the reception server with information on the first message, which is a UE message received by the transmission server (S141). When transmitting the connection request, the transmission server may provide type information indicating that the connection is based on the transmission conversion type. In this case, the reception server may transmit information on parameters configured in relation to its platform to the transmission server in response to the connection request (S143). The configured parameters may include configuration or parameter information related to the reception server (or receiving end), such as grouping configuration methods (topics in the case of MQTT), encoding types, message types, transmission intervals, etc. The transmission server and reception server may perform group registration related to the reception server based on the parameter information. Through the group registration, a first connection (e.g., Publish link, Subscribe link, etc.) for exchanging a group message for a group related to the reception server may be formed between the transmission server and reception server. For example, if the grouping configuration included in the response message is the MQTT protocol, the first connection may be formed based on MQTT related to the topic. If the grouping configuration method included in the response message is based on the TCP/IP, the first connection may be formed based on socket connection information related to the group (e.g., TCP/IP list information of UEs related to the group).

Next, the transmission server may receive the first message from the UE on uplink (S146). When the configuration based on the received parameter information is completed, the transmission server may convert the first message into the second message that matches the message type and encoding type of the reception server and then transmit the server message including the second message to the reception server (S147). The server message may be transmitted (or published in the case of MQTT) through the first connection based on the group (topic in the case of MQTT) established based on the initial step (S143). The reception server may transmit the second message included in the received server message directly to UEs served by the reception server or the users of the UEs without any separate conversion.

Figure 15:
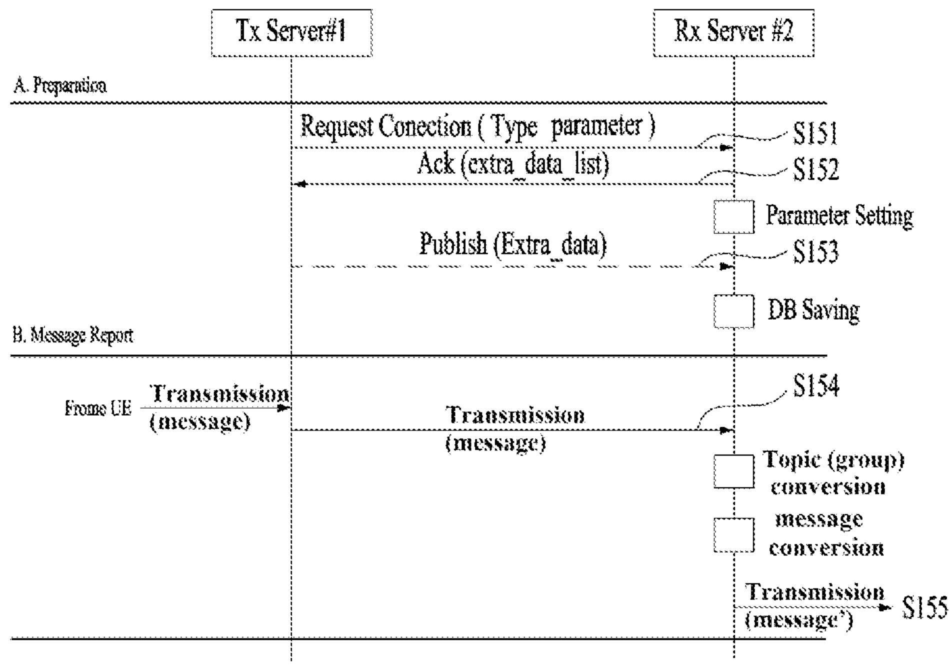

Referring to FIG. 15, the transmission server and reception server may perform operations to convert and exchange the first message based on the reception conversion (Rx convert) type. Specifically, the reception server may receive the above-described connection request from the transmission server (S151). The message transmitted and included in the request may include the conversion type (i.e., type based on the reception conversion method) and/or the parameter information on the parameters related to the transmission server. In this case, the reception server may transmit an acknowledgement (ACK) to the transmission server if the reception server is capable of message conversion according to the reception conversion method (for example, if the reception server supports the convert function) (S152). The reception server may obtain configuration information related to the transmission server based on the parameter information on the transmission server. If the information provided periodically by the transmission server is insufficient, the reception server may temporarily request the transmission server to transmit additional data (S153). The reception server may store the additional data in a DB block and continuously use the additional data when converting the first message.

For example, the transmission server does not periodically transmit the “vehicle size” of a vehicle related to the UE, but the reception server may need to insert information on the “vehicle size” of the vehicle related to the UE into a message and transmit the message (to other UEs or other vehicles). In this case, the reception server may receive information on the vehicle size of the vehicle related to the UE from the transmission server in advance and store the information in the DB block. If the reception server receives a message with the corresponding ID, the reception server may periodically transmit a message with the additional information. In other words, for the service (V2N platform) provided by the transmission server, even if periodic transmission of a message containing the information on the vehicle size related to the UE receiving the service is not required by UEs or vehicles related to the V2N platform. However, for the service (V2N platform) provided by the reception server, periodic transmission of a message containing the information on the vehicle size may be required.

In this case, the reception server may request the transmission server to transmit the information on the vehicle size of the vehicle related to the UE in advance and transmit the received information on the vehicle size in a message related to the UE.

Thereafter, once the configuration is completed, the transmission server may transmit the server message containing the first message received from the UE to the reception server (publish the server message in the case of MQTT) (S154). The reception server may convert the first message included in the server message into the second message, which is related to the service thereof. The reception server may confirm or extract the group (topic in the case of MQTT) based on data included in the first message. If there is a change in the group, the reception server may update the group (i.e., register the topic). The reception server may transmit the converted second message to its users (users for the updated group). On the other hand, if there is no change in the group related to the service thereof, the reception server may transmit the second message by converting only the configuration and type of the first message.

Figure 16:
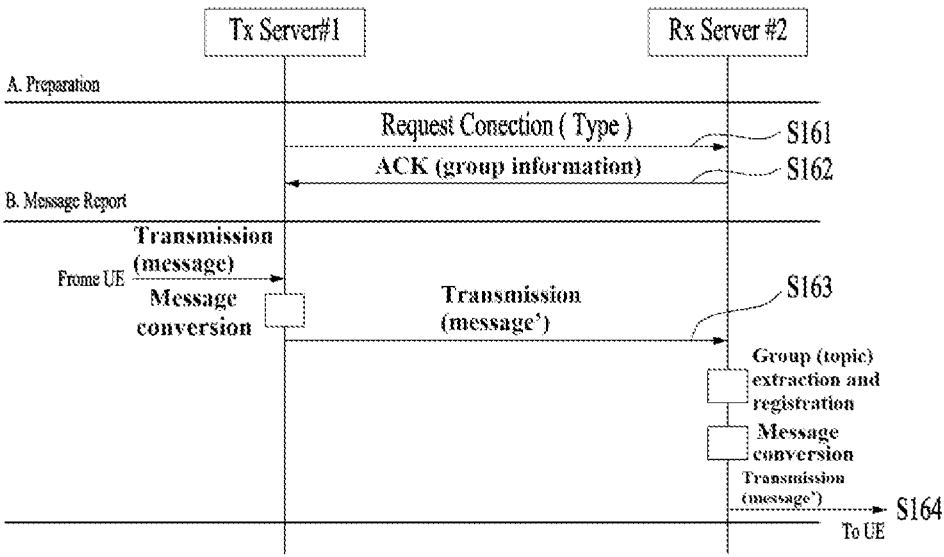

Referring to FIG. 16, the transmission server and reception server may perform operations to convert and exchange the first message based on the integrated conversion type. As described above, the integrated conversion type refers to a method to convert and exchange messages between the transmission server and reception server according to a predetermined way, which may be easily applied to various types of servers. The transmission server may transmit a connection request to the reception server to provide the reception server with information on UEs related to the transmission server (S161). The transmission server may further include information on the convert type (i.e., integrated conversion type) in the message related to the request. The reception server may transmit a response message including information on a group related to the reception server and an ACK to the transmission server (S162). Next, the transmission server may convert the first message received from the UE into the integrated message, which is a message common to all servers (i.e., message processed by all servers) and then transmit the server message including the integrated message to the reception server. The reception server may extract the group related to the reception serve based on the received integrated message and registers the extracted group. Subsequently, the reception serve may convert the integrated message into the second message based on its own message type and transmit the second message to UEs served by the reception server (S163). Regarding the integrated conversion type, the integrated message common between the transmission server and reception server may correspond to a message used or configured for the RTA server described above with reference to FIG. 12.

When there is a difference in information between the transmission server and reception server (for example, when there is a difference between the information required for UEs in the platform provided by transmission server #1 and the information required for UEs in reception server #2), even if the reception server receives the first message about UEs from the transmission server, the reception server may not obtain partial information from the first message. For example, in the case of the reception convert type, the reception server needs to receive the first message and directly convert the first message into the second message. However, in this case, information for configuring the second message may not be included in the first message.

Figure 17:
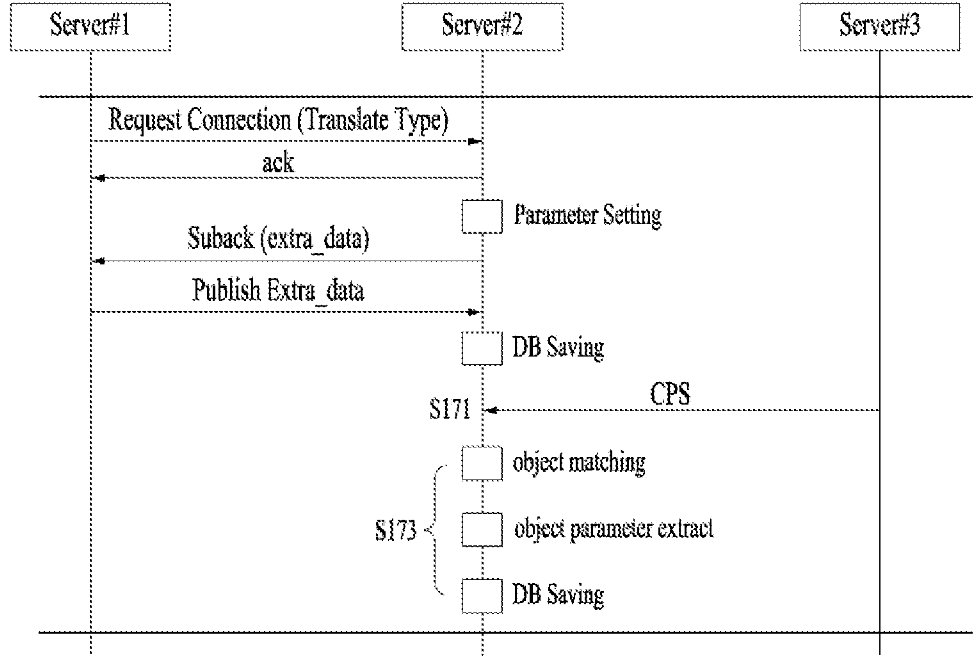

Specifically, referring to FIG. 17, the reception server may transmit a message requesting the partial information to the transmission server. Alternatively, the reception server may obtain the partial information from advanced driver assistance system (ADAS) sensors mounted on vehicles related to UEs or information from cameras mounted on smart road side units (RSUs).

To this end, the reception server may receive a collective perception message (CPM) or collective perception service (CPS) message generated by the ADAS vehicle or smart RSU (S171). The reception server may match an object corresponding to the UE related to the first message based on the CPM or CPS message and then extract necessary parameters or the partial information from the object container of the CPM or CPS message related to the matched object (S173). Thereafter, the reception server may store the extracted value in the internal DB and use the stored value to convert the first message into the second message.

Group Interchange Function

The communication method used in the V2N system for transmission is long-range communication. Thus, the reception server needs to create a reception group to transmit received messages in order to provide services related to vehicle safety to UEs in specific areas that require communication. Various V2N platforms may group UEs based on user IDs, road IDs, tiles, or zones to transmit V2X messages to all the groups. Accordingly, the transmission server and reception server need to perform group interchange operations for UEs to facilitate V2X communication among various V2N platforms. Hereinafter, the group interchange operations will be described in detail.

Figure 18:
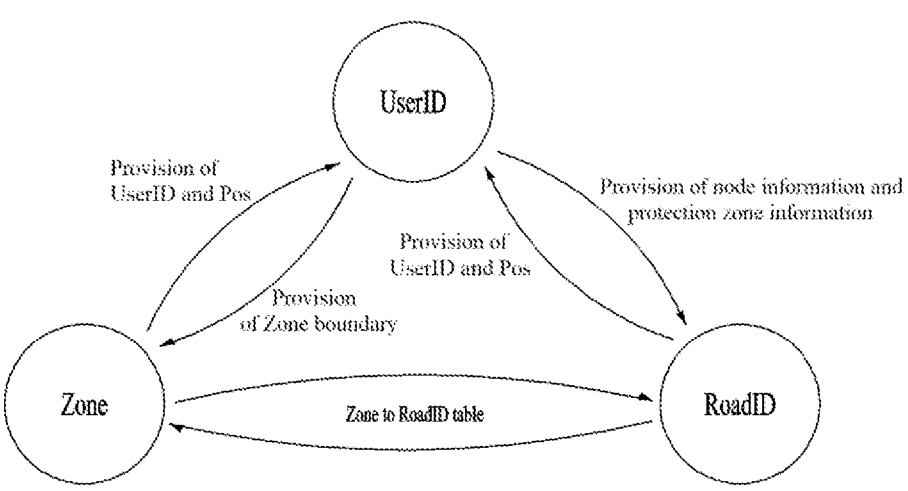
FIGS. 18 to 20 are diagrams for explaining operations in which a reception server or transmission server groups UEs.
Figure 19:
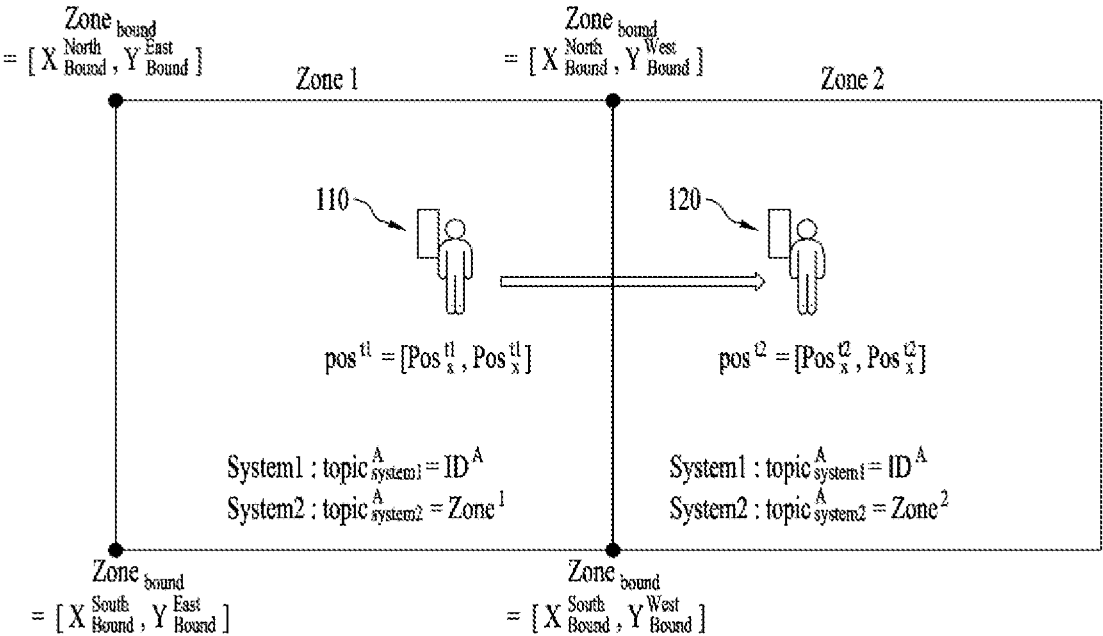
Figure 20:
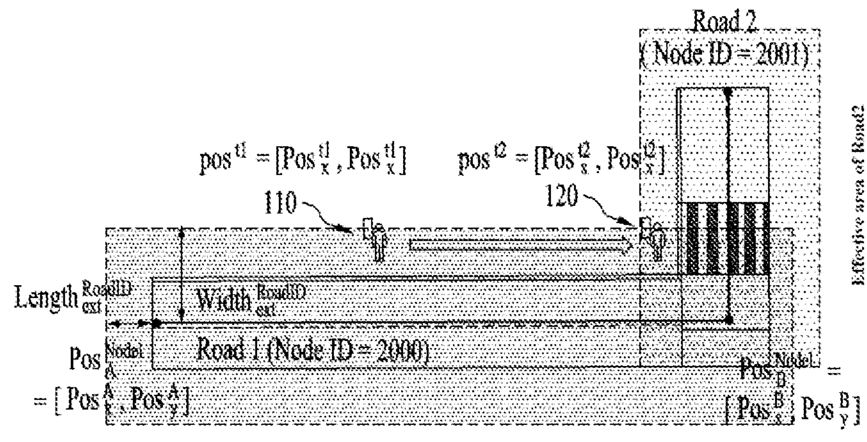

FIGS. 18 to 20 are diagrams for explaining operations in which a reception server or transmission server groups UEs.

Referring to FIG. 18, a group interchange operation for UEs (or grouping operation for the UEs) may be performed based on the UE IDs, zone IDs (or zones), and/or road IDs of the UEs. For example, a group based on the UE IDs of UEs (or unicast form for specific UEs) may be converted into a road ID-based group or a zone ID-based group, a zone ID-based group may be converted to a UE ID-based group or road ID-based group, and a road ID-based group may be converted to a UE ID-based group or zone ID-based group.

The group interchange operation may be applied not only to the above-described group configuration method but also to various group configuration methods including the above-described group configuration method.

Referring to FIG. 19, the first system and/or second system may perform an interchange operation between UE ID-based groups and zone ID (or zone)-based groups. Specifically, a UE (or VRU) may be located at a first position ($Pos^{t1}$) at a first time (t1) (110) and then move to a second position ($Pos^{t2}$) at a second time (t2) (120). In this case, the first system (system 1), which establishes groups (topics) based on UE IDs, does not change a group $$(topic^{A}_{system1})$$

even when the UE is at the second location because the UE maintains the same UE ID at both the first and second times. In contrast, the second system (system 2), which establishes groups based on zones or zone IDs, may set the UE to a first group $$(topic^{A}_{system2})$$

at the first time and set the UE to a second group $$(\text{topic}^{B}_{system2})$$

at the second time. In this case, to transmit a message about the UE to the second system, the first system needs to convert information on the location of the UE with the same ID into information on a related zone (for example, a zone corresponding to the location information on the UE among zones distinguished by tiles). To this end, the first system may receive information on zones or information on zone IDs (or information on zone boundaries) managed by the second system in advance, determine a zone-based group related to the location of the UE based on the received zone information (or zone boundary information), and convert the UE ID-based group into the zone-based group. For example, the first system may convert the UE-based group into the zone-based group according to Equation 1 below.

[Equation 1]

$$\text{If } Pos_y < Y^{West}_{bound},\quad \text{topic}^{A}_{system1} \rightarrow \text{topic}^{A}_{system2}$$

$$\text{If } Pos_y > Y^{West}_{bound},\quad \text{topic}^{A}_{system1} \rightarrow \text{topic}^{A}_{system2}$$

Alternatively, when the first system transmits a server message containing a first message about the UE to the second system, and when the second system directly performs the group conversion, the first system may provide information on the UE ID and/or location of the UE to the second system (via a header of the server message). In this case, the second system may convert the UE-based group into the zone-based or zone ID-based group based on the location and UE ID.

Referring to FIG. 20, the first system and/or second system may perform an interchange operation between UE ID-based groups and road ID-based groups. Specifically, a UE (or VRU) may be located at a first position ($Pos^{t1}$) at a first time (t1) (110) and then move to a second position ($Pos^{t2}$) at a second time (t2) (120). In this case, the first system (system 1), which establishes groups (topics) based on UE IDs, does not change a group $$(\text{topic}^{A}_{system1})$$

even when the UE is at the second location because the UE maintains the same UE ID at both the first and second times. In contrast, the second system (system 2), which establishes groups based on road IDs, may set the UE to a first group $$(\text{topic}^{RoadID=2000}_{system2})$$

at the first time and set the UE to a second group $$(\text{topic}^{RoadID=2001}_{system2})$$

at the second time. In this case, to transmit a message about the UE to the second system, the first system needs to convert information on the location of the UE with the same ID into a related road ID-based group. To this end, the first system may receive information on road IDs or information on road boundaries (i.e., information on nodes and information on protection zones $$(\text{Length}^{RaodID}_{ext}, \text{Width}^{RaodID}_{ext}))$$

managed by the second system in advance. The first system may convert a UE ID-based group into a road ID-based group based on the received road ID information.

Alternatively, when the second system directly performs group conversion (e.g., reception conversion type), the second system may receive information about the UE ID and/or location ID (via a header of a server message) from the first system. The second system may convert the UE ID-based group into the road ID-based group based on the UE ID and/or location ID.

Figure 21:
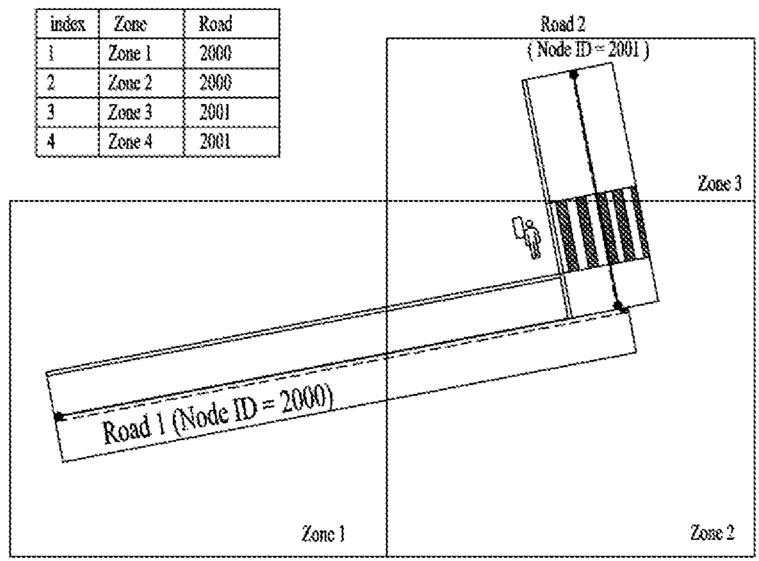

Referring to FIG. 21, the first system and/or the second system may interchange zone-based groups and road ID-based groups. A mapping table between zones and road IDs may be preconfigured to interchange zone-based groups and road ID-based groups. For example, Road 1 (RoadID=2000) may be matched with Zones 1 and 2, and Road 2 (RoadID=2001) may be matched with Zones 2 and 3. Based on the mapping table for mapping or matching relationships, the first and second systems may easily perform group interchange between zone-based groups and road ID-based groups. Alternatively, for more accurate group interchange, group interchange between zone-based groups and road ID-based groups may be performed by sequentially applying the group interchange method described with reference to FIG. 20 and the group interchange method described with reference to FIG. 21.

Figure 22:
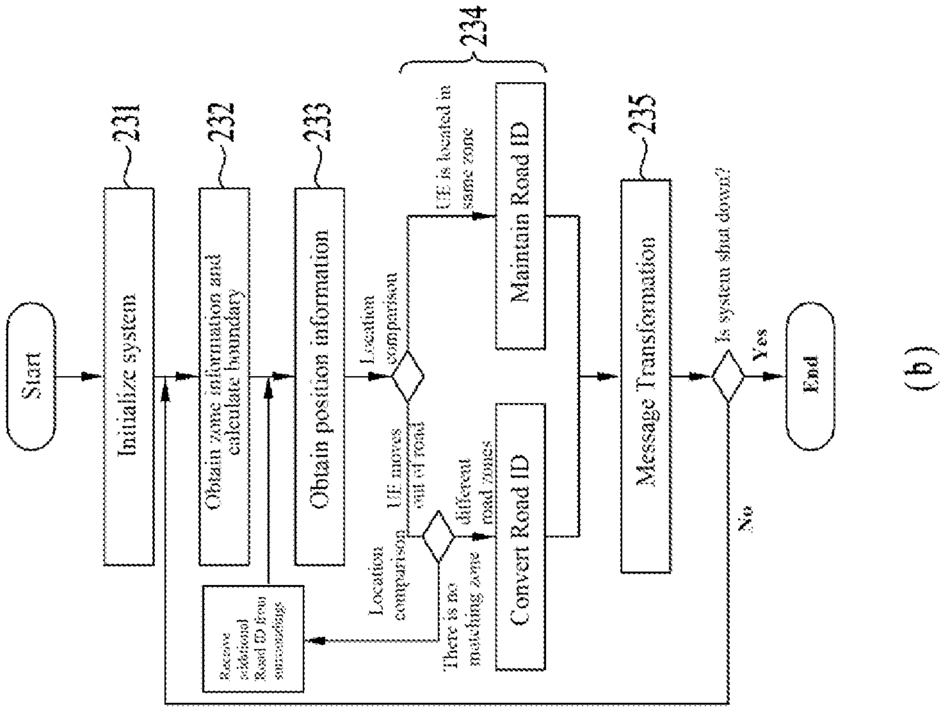
FIGS. 22 and 23 are flowcharts for explaining methods by which a first and/or second system (or group conversion block) performs group interchange.
Figure 22:
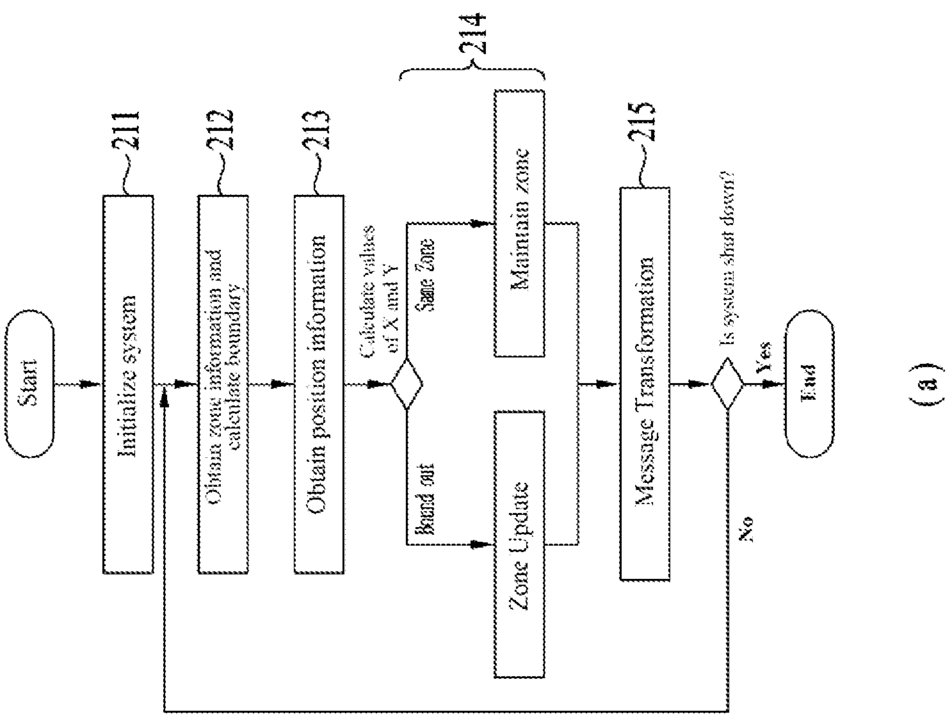
Figure 23:
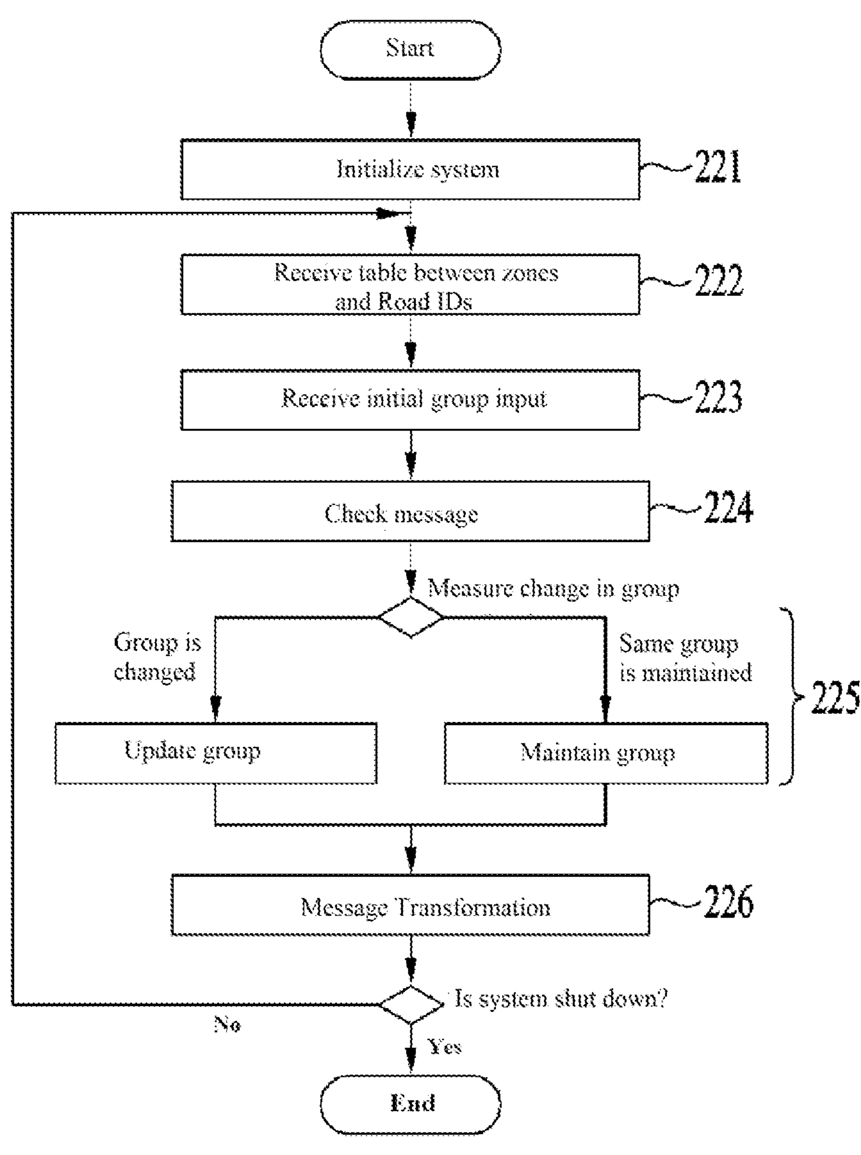

FIGS. 22 and 23 are flowcharts for explaining methods by which a first and/or second system (or group conversion block) performs group interchange.

Referring to FIG. 22(*a*), the first system may configure a first group for messages based on UE IDs, while the second system may configure a second group based on zones or zone IDs. In this case, the first system may convert the first group configured based on the UE IDs into the second group based on the zones (or zone IDs). The first system may update the second group based on the location of a UE.

Specifically, the first system (or group conversion block) initializes the system when the system starts (S211). The first system may obtain zone information by communicating with a server or checking a pre-stored DB and calculate boundaries corresponding to the zone information (S212). The first system may obtain the location information on the UE from a first message received from the UE (S213) and compare the location information and the zone information to determine whether to maintain or change the current zone (S214). If the coordinates based on the location information is within the boundaries of the previous zone, the first system may keep the zone of to the UE as the current zone. In this case, the first system (or interchange controller) may convert the first message into a second message without any group updates (e.g., without any changes in the topic or socket connection information on a first connection). On the other hand, if the coordinates included in the location information are outside the boundaries of the previous zone, the first system may determine a new zone corresponding to the coordinates based on the current zone and the coordinates. Then, the first system may update the current second group to a new second group corresponding to the new zone. For example, for the first connection based on the MQTT protocol, the first system may convert the current second group into the new second group by registering a topic corresponding to the new second group for the first connection. Alternatively, for the first connection based on TCP/IP, the first system may update the group by forming the first connection based on socket connection information on UEs included in the second group. In this case, the first system may change a reception group related with the second message included in a server message by changing the topic and/or socket connection information on the first connection (e.g., TCP/IP list of UEs corresponding to the new second group). The first system may convert the first message into the second message corresponding to the second system (S215). Additionally, the first system may transmit (publish) the server message containing the second message through the first connection to the second system. In this case, the server message may include information on a V2X message exchanged between UEs, and the server message may be the V2X message.

Alternatively, the first system may configure the first group for messages based on UE IDs, while the second system may configure the second group based on roads (or road IDs). In this case, the first system may convert the first group configured based on the UE IDs into the second group based on the roads (or road IDs). Subsequently, the first system may determine whether to update the second group based on the location of a UE.

Specifically, referring to FIG. 22(*b*), when the system starts, the first system may initialize the system (S231) and obtain road boundary information or road information by communicating with a server or checking a pre-stored DB. The first system may then calculate a protection zone based on the road information (S232). The first system may obtain location information on the UE from a first message received from the UE (S233). The first system may determine whether to update or maintain the second group for the current road ID by comparing the location information with the road information (or protection zone) (S234). If the coordinates included in the location information are within the protection zone corresponding to the previous road ID, the first system may maintain the road ID for the UE as the previous road ID (i.e., maintain the current second group). In this case, the first system (or interchange controller) may convert the received first message into the second message (without any changes in the topic or socket connection information on a first connection). In contrast, if the coordinates included in the location information are outside the protection zone corresponding to the previous road ID, the first system may analyze whether the UE moves to a protection zone corresponding to a different road ID or outside the road. If the UE moves outside the road, the first system may obtain road information on a wider area but may hold off transmitting a server message to the second server. On the other hand, if the UE enters or moves to the protection zone corresponding to the different road ID, the first system may update to a new second group corresponding to the different road ID. For example, for the first connection based on the MQTT protocol, the first system may convert the current second group into the new second group by registering a topic corresponding to the new second group for the first connection. Alternatively, for the first connection based on TCP/IP, the first system may update the group by forming the first connection based on socket connection information on UEs included in the second group. In this case, the first system may change a reception group related with the second message included in the server message by changing the topic and/or socket connection information on the first connection (e.g., TCP/IP list of UEs corresponding to the new second group). The first system may convert the first message into the second message corresponding to the second system (S235). Additionally, the first system may transmit (publish) the server message containing the second message through the first connection to the second system.

Alternatively, the first system may configure a group for messages based on zones or zone IDs, while the second system may configure a group based on roads (or road IDs).

Subsequently, the first system may determine whether to update a second group based on a mapping table between zones and roads.

Specifically, referring to FIG. 23, the first system (group conversion block) may convert a zone-based group into a road ID-based group. The first system (group conversion block) may initialize the system when the system starts (S221). The first system may can obtain the mapping table (Zone-RoadIDtable) between zone IDs and road IDs through communication with a server or from a pre-stored DB (S222). Based on the mapping table, the first system may verify or retrieve the initial zone-based group for a UE and initial road ID group thereof (S223). Upon receiving a first message from the UE, the first system may obtain information on the location of the UE (S224). Based on the obtained location, the first system may determine whether the initial group based on an initial zone related to the UE changes to a different first group based on a different zone (S225). For example, if the first system detects that the initial first group changes the different first group, the first system may determine, based on the mapping table, whether an initial second group based on an initial road ID changes to a different second group based on a different zone-based group. Even if the zone-based group changes but the road ID-based group remains unchanged, the first system may maintain the group for messages as the initial second group and transmit to the second system. On the contrary, if the road ID-based group also changes, the first system may update the initial second group to the different second group based on the mapping table. For example, for the first connection based on the MQTT protocol, the first system may convert the current second group into the new second group by registering a topic corresponding to the new second group for the first connection. Alternatively, for the first connection based on TCP/IP, the first system may update the group by forming the first connection based on socket connection information on UEs included in the second group. In this case, the first system may change a reception group related with the second message included in the server message by changing the topic and/or socket connection information on the first connection (e.g., TCP/IP list of UEs corresponding to the new second group). The first system may convert the first message into the second message corresponding to the second system (S226). Additionally, the first system may transmit (publish) the server message containing the second message through the first connection to the second system.

Hereinafter, a method of defining messages exchanged between first and second systems will be described in detail.

Figure 24:
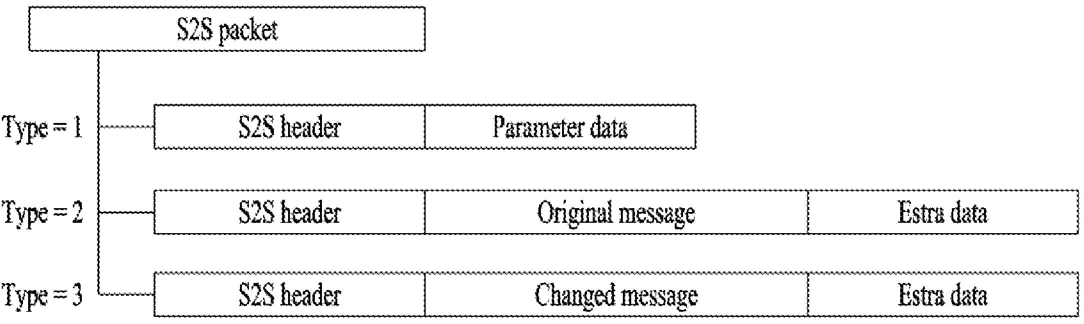
FIG. 24 is a diagram for defining messages exchanged between first and second systems.

FIG. 24 is a diagram for defining messages exchanged between first and second systems.

Referring to FIG. 24, the first and second systems may exchange message information on UEs in a server-to-server (S2S) message or server message. In this case, the exchanged server message may include a connection request message, response message, additional data request message, and so on, as described above. The S2S messages may be composed of an S2S header and a payload. Depending on the message type of the S2S header, the payload may be composed of the following elements: parameter data, original message, changed message, and additional data. The S2S header may include summarized information to quickly obtain details such as a message generation time, user ID, data type, and content. The S2S header may include summary information to quickly obtain a message creation time, user ID, data type, and content. Here, the original message may include a message from the first system (system receiving a first message from the UE), while the changed message may include a second message converted from the first message by the first system to align with services provided by the second system, which is the target system.

For a Type 1 S2S message, the payload may contain the parameter data. The parameter data may contain configuration information on each system. For example, the parameter data may include information such as a service type, message type, encoding type, topic type, tile level, and so on. For example, the Type 1 S2S messages may be exchanged during a process in which the first system requests a connection to the second system.

For a Type 2 S2S message, the payload may contain the original message and/or additional data. The original message may include information in the first message required for conversion of the first message to the second message. The additional data may include additional data required for conversion to the second message in addition to the information in the first message. For a type 3 S2S message, the payload may also include the additional data.

The additional data may include useful information included in the first message but not included in the second message.

Specifically, the header of the S2S message for the message conversion may be configured as shown in Table 5 below.

TABLE 5

| Item | Description |
|---|---|
| PacketType | Communication message types between servers (0: RTA message, 1: Integrated message, 2: PlatformType1 or transmission conversion type, 3: Platform1Type2 or reception conversion type) |
| MsgID | Message ID (32-bit unique data) |
| MsgGenTime | Message generation time. |
| GroupType | Group types (UserID, zone, RoadID) |
| UserID | DE_UserID |
| Position | DF_Position |
| ZoneID | DE_ZoneID |
| RoadID | DE_ZoneID |
| EncodingType | Encoding types of message (1, ASN.1, 2, . . . ) |
| MessageType | Types of message (examples in the case of ITS type 1: BSM, 2: PSM 3: MAPM, 4: SPaTM) |
| V2NMessage | Message |
| ExtensionData | Additional data |

In Table 5, PacketType may indicate the type of the S2S message, MsgID may include an ID for identifying a message, and MsgGenTime may indicate a time when the message is generated. In addition, GroupType may inform the type of group related to group conversion or interchange, and UserID may be used to identify a device. The position of the header may provide information on the location of a UE in advance. Additionally, ZoneID in the header may provide information on the zone related to the message in advance and RoadID in the header may provide information on the road ID related to the message in advance.

Figure 25:
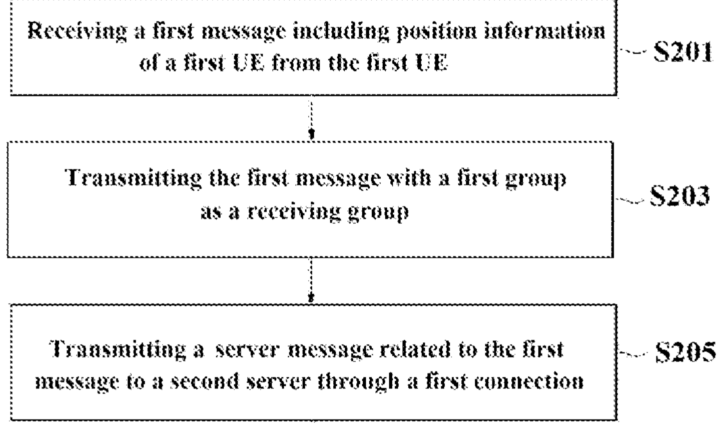
FIG. 25 is a diagram for explaining a method by which a first server transmits a server message to a second server through a first connection.

FIG. 25 is a diagram for explaining a method by which a first server transmits a server message to a second server through a first connection.

Referring to FIG. 25, the first server may receive a first message containing information on the location of a first UE from the first UE among a plurality of UEs that receive V2N-related services (S201). The first server may configure a first group related to the location information on the first UE among the plurality of UEs that receive the V2N-related services as a reception group and transmit the first message (S203). In this case, the first server may transmit the first message as a group message to UEs in the first group among the plurality of UEs using a topic in the case of the MQTT protocol and/or a packet in the case of the TCP/IP. For example, as described above, the first server may determine the first group related to the first message based on the location information on the first UE included in the first message and group configuration criteria (e.g., zones, roads, or UE IDs). The first server may provide or transmit the first message to the UEs included in the first group by associating the first message with the topic or packet related to the first group.

Next, the first server may provide or transmit (or publish) the server message, which is related to the first message received from the first UE, to the second server through the first connection established with the second server, which provides V2N services based on another platform (S205).

Specifically, the first server may transmit a connection request message to the second server to request the first connection for the transmission of the server message. As described above, the connection request message may further include conversion type information related to conversion of the first message. The first server may receive a response message from the second server after transmitting the connection request message. The first server may establish the first connection based on the response message and the transmission conversion type. The response message may include parameter information on transmission configurations of the second server such as a group (topic in the case of MQTT) configuration method (or group type information), encoding type, message type, transmission interval, and so on as described above.

When the first server transmits the connection request message containing the conversion type information, which is the transmission conversion type, the first server may transmit the server message including the second message converted to match message configurations provided by the second server to the second server through the first connection.

Specifically, the first server may convert the first message to the second message to match the transmission configurations and message configurations of the second server, based on the parameter information included in the response message. The first server may transmit the server message including the converted second message to the second server. In addition, the first server may convert the first group into a second group corresponding to the group type information related to the second server included in the response message. The first server may configure the reception group for receiving the second message through the first connection as the second group rather than the first group. For example, if the first connection is based on the MQTT protocol, the first server may register a topic corresponding to the second group in the first connection and configure the reception group for receiving the second message as the second group. In this case, the first server may provide the server message including the second message to the second server by publishing the topic corresponding to the second group, which is identified based on the group type information. The second server may receive the server message by subscribing the published server message. Alternatively, if the first connection is based on the TCP/IP, the first server may configure or set the reception group for the second message as the second group by establishing a connection with a socket connection list related to UEs in the second group (e.g., TCP/IP list of the UEs).

Alternatively, if the conversion type information is the reception conversion type, the first server may transmit the server message including the first message to the second server through the first connection without converting the first message received from the first UE. In this case, the first server may transmit parameter information such as transmission configurations and message types related to the first server to the second server in the connection request message. Based on the parameter information from the first server, the second server may transmit a request message to the first server to request additional data that is necessary for the message configurations of the second server. The second server may convert the first message into the second message related to parameters thereof based on the additional data obtained from the first server. The second server may extract the second group related to the group type for the second server from the server message and transmit the second message for the second group to UEs served by the second server. Alternatively, the second server may directly obtain the additional data from object matching based on a CPM or CPS message.

Alternatively, if the conversion type information is the integrated conversion type, the first server may convert the first message received from the first UE into an integrated message based on preconfigured integrated message configurations. The first server may transmit the server message including the integrated message to the second server through the first connection. The second server may convert the integrated message into the second message related to the parameters thereof. The second server may extract the second group related to the group type for the second server from the integrated message and transmit the second message for the second group to the UEs served by the second server.

The group type information described above may include at least one of a first type for configuring a group based on the zone related to the location information, a second type for configuring a group based on the road related to the location information, or a third types for configuring a group based on the UE ID related to the UE.

In this case, if the first group is configured based on the first type and if the group type information includes information on the second type, the first server may determine a first road (or first road ID) matching a first zone (or first zone ID) related to the location information on the first UE based on a mapping table between zones and roads. The first server may convert the first group for the first zone into the second group configured for the first road. Alternatively, if the first group is configured based on the third type and if the group type information includes information on the second type, the first server may identify a road or road ID related to the location information based on the location information on the first UE and road information related to the second type. In addition, the first server may identify or confirm the second group, which is configured for the road or road ID. In this case, the first server may convert the first group based on the UE ID into the second group based on the road and configure the second group as the reception group for the second message. For example, the first server may configure the reception group for the second message as the second group by registering a topic for the identified second group for the first connection or establishing a connection based on socket list information.

Figure 26:
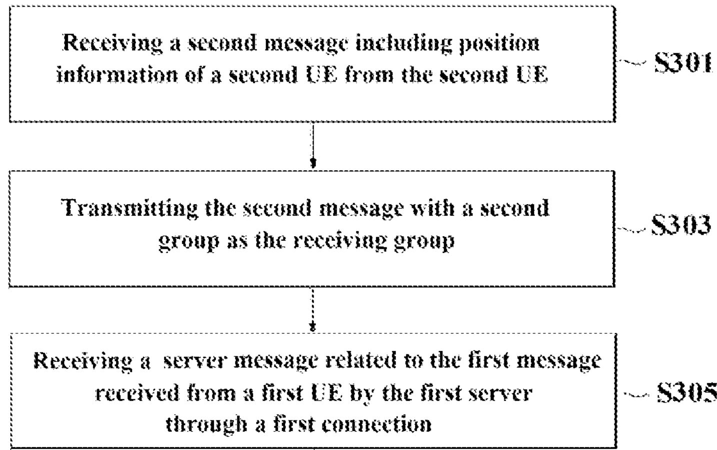
FIG. 26 is a diagram for explaining a method by which a second server receives a server message from a first server through a first connection.

FIG. 26 is a diagram for explaining a method by which a second server receives a server message from a first server through a first connection.

Referring to FIG. 26, the second server may receive a second message containing information on the location of a second UE from the second UE among a plurality of UEs that receive V2N-related services (S301). The second server may configure a second group related to the location information on the second UE among the plurality of UEs that receive the V2N-related services as a reception group and transmit (or retransmit) the second message (S203).

Next, the second server may receive, from the first server, the server message containing information related to a first UE that receives V2N services from the first server through the first connection established with the first server that provides the V2N services based on another platform (S305).

Specifically, the second server may receive a connection request message from the second server, where the connection request message requests the first connection for the transmission of the server message. As described above, the connection request message may further include conversion type information.

The second server may receive the connection request message containing the conversion type information, which is the transmission conversion type, from the first server. When the second server transmits a response message in response to the connection request message, a first connection may be established based on the response message. The second server may receive the server message including a first message about the first UE received by the first server from the first server through the first connection. In addition, the second server may receive the server message, where the second group related to the second server is configured as the reception group, through the first connection. For example, if the first connection is based on the MQTT protocol, and if the first server registers a topic for the first connection as the topic related to the second group, the second server may receive the server message where the second group is configured as the reception group.

Alternatively, if the conversion type information is the reception conversion type, the second server may receive the server message where the first message is not converted from the first server through the first connection. In this case, the second server may obtain parameter information such as transmission configurations and message types related to the first server from the connection request message. The second server may transmit a request message to the first server to request additional data that is necessary for message configurations of the second server. The second server may convert the first message included in the server message into the second message related to parameters thereof based on the additional data obtained from the first server. The second server may extract the second group related to the group type for the second server from the second message and transmit the second message for the second group to UEs served by the second server. Alternatively, the second server may directly obtain the additional data from object matching based on a CPM or CPS message. In other words, the second server may transmit the request message requesting first information to the first server based on that the first message does not include the first information for conversion to the second message. In this case, if the first information or part of the first information is not included in a response message in response to the request message, the second server may receive the CPM or CPS message and obtain the first information or part of the first information from object matching based on the CPM or CPS message.

Alternatively, if the conversion type information is the integrated conversion type, the second server may receive an integrated message from the first server through the first connection. The second server may convert the integrated message into the second message related to the parameters thereof, extract the second group related to the group type for the second server from the integrated message, and transmit the second message for the second group to the UEs served by the second server.

Regarding the conversion of messages about UEs interchanged between servers, the transmission conversion type, reception conversion type, and integrated conversion type may be newly defined, thereby facilitating an agreement in message and group transformation types between first and second servers that support different message formats and group configuration methods. Based on this agreement, servers based on different V2N platforms may efficiently share information and messages about UEs. Specifically, the first server agrees in advance based on conversion type information whether to convert a received UE message into a message format related to the parameters of the second server, thereby effectively resolving the differences in V2N platforms between the first and second servers. For the transmission conversion type, the first server may convert a reception group for the received UE message based on a group configuration method related to the parameters of the second server, thereby significantly reducing the overhead on the second server due to the group conversion of the UE message. For the reception conversion type, the second server may request in advance the first server to transmit information necessary for configuring a message thereof in an additional data request message, thereby effectively and promptly configuring the message based on the UE message. Additionally, for the transmission conversion type, the first server may quickly perform group conversion into a group for the second server based on a mapping table between zones based on the zone-based group configuration method and roads based on the road-based group configuration method.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 27:
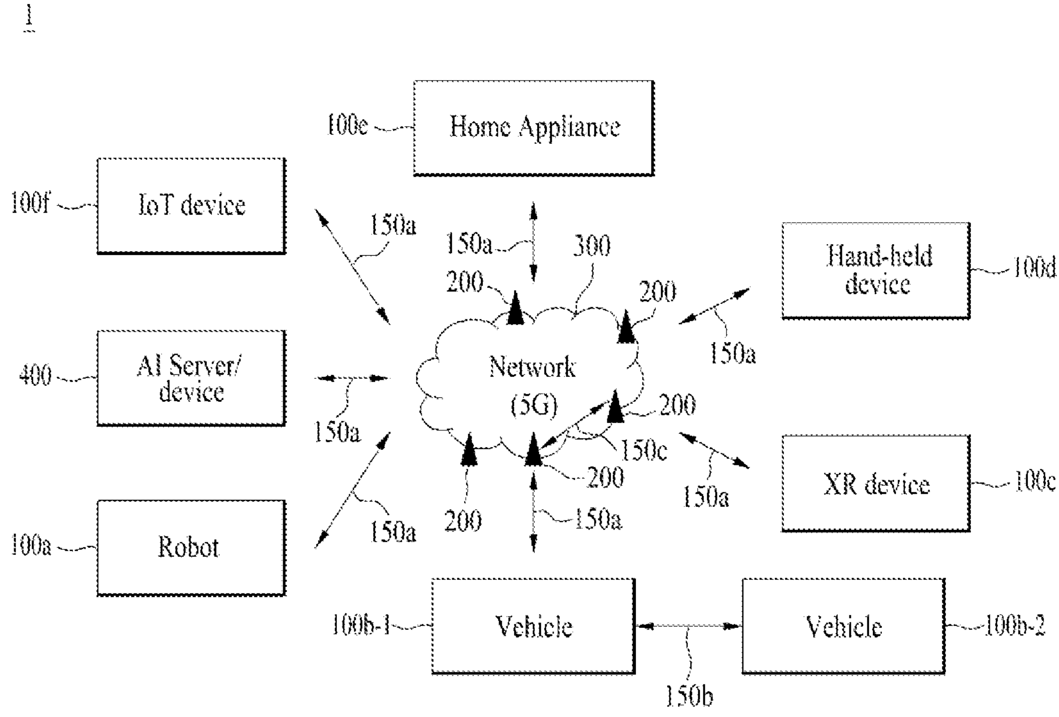
FIG. 27 illustrates a communication system applied to the present disclosure.

FIG. 27 illustrates a communication system applied to the present disclosure.

Referring to FIG. 27, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 28:
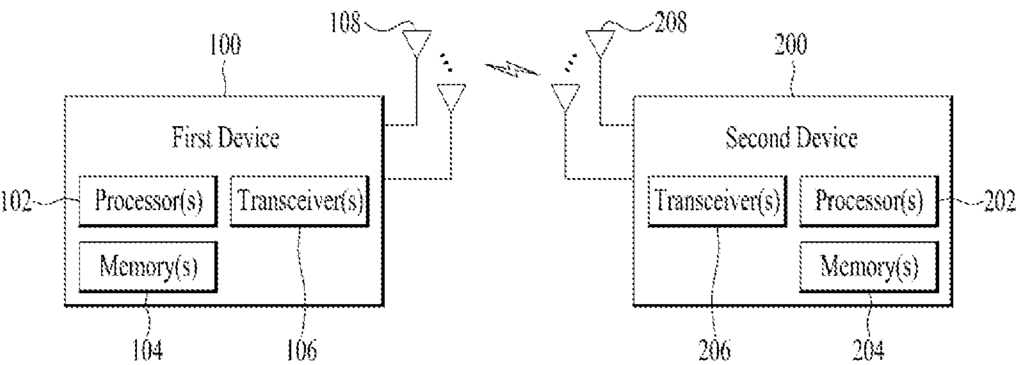
FIG. 28 illustrates wireless devices applicable to the present disclosure.

FIG. 28 illustrates a wireless device applicable to the present disclosure.

Referring to FIG. 28, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 27.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information acquired by processing the second information/signals in the memory(s) 104. The memory(s) 104 may be connected to the processor (s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, the first wireless device 100 may be a first server that provides V2N-related services based on a V2N platform. The first server 100 may include the processor(s) 102 connected to the transceiver(s) 106 and the memory(s) 104. The memory(s) 104 may include at least one program for performing operations related to the embodiments described above in FIGS. 11 to 26.

The processor(s) 102 may be configured to control the transceiver(s) 106 to: receive a first message including location information on a first UE from the first UE; transmit the first message for which reception group is set to a first group to UEs; and transmit the server message to a second server through a first connection. The first connection may be established based on a response message received in response to transmission of a connection request message including conversion type information to the second server. Based on the conversion type information is a transmission conversion type, the processor(s) 102 may be configured to: convert the first group into a second group based on group type information included in the response message; and set a reception group for the second message included in the server message to the second group through the first connection.

Alternatively, the processor(s) 102 and the memory(s) 104 may be included in a chipset configured to transmit a server message to a second server. The chipset may include: at least one processor; and at least one memory operably connected to the at least one processor and configured to, when executed, cause the at least one processor to perform operations. The operations may include: receiving a first message including location information on a first UE from the first UE; transmitting the first message for which reception group is set to a first group to UEs; establishing a first connection based on a response message received in response to transmission of a connection request message including conversion type information to the second server; and based on the conversion type information is a transmission conversion type, transmitting the server message including the second message to the second server through a first connection. A reception group for the second message may be converted into a second group related to the first group based on group type information included in the response message. The processor(s) 102 may include at least one program for performing operations related to the embodiments described in FIGS. 11 to 26 based on the program included in the memory(s) 104.

Alternatively, there is provided a computer-readable storage medium including at least one computer program configured to perform operations of transmitting a second message to a second server. The computer-readable storage medium may include the at least one computer program. The at least one computer program may be stored on the computer-readable storage medium. The operations may include: receiving a first message including location information on a first UE from the first UE; transmitting the first message for which reception group is set to a first group to UEs; establishing a first connection based on a response message received in response to transmission of a connection request message including conversion type information to the second server; and based on the conversion type information is a transmission conversion type, transmitting the server message including the second message to the second server through a first connection. A reception group for the second message may be converted into a second group related to the first group based on group type information included in the response message. The processor(s) 102 may include at least one program for performing operations related to the embodiments described in FIGS. 11 to 26 based on the program included in the memory(s) 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor (s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Specifically, the second wireless device 200 may be a second server that provides V2N-related services based on a V2N platform. In this case, the second server may operate based on a V2N platform that configures messages in a different way from the above-described first server or sets or configures a reception group for messages in a different way from the first server. The second server 200 may include the processor(s) 202 connected to the transceiver(s) 206 and the memory(s) 204. The memory(s) 204 may include at least one program for performing operations related to the embodiments described above in FIGS. 11 to 26.

The processor(s) 202 may be configured to control the RF transceiver to: receive a second message including location information on a second UE from the second UE; transmit the second message for which reception group is set to a second group to UEs; and receive the server message from the second server through a first connection. The first connection may be established based on transmission of a response message in response to a connection request message including conversion type information received from the first server. Based on the conversion type information is a transmission conversion type, a reception group for the second message included in the server message may be converted to the second group based on group type information included in the response message through the first connection.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 29:
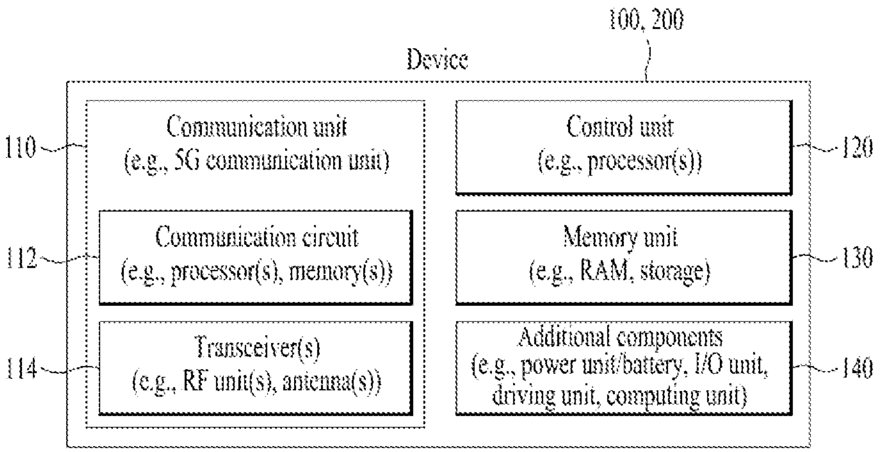
FIG. 29 illustrates another example of a wireless device to which the present disclosure is applied.

FIG. 29 illustrates another example of a wireless device applied to the present disclosure. The wireless device may be implemented in various forms according to a use-case/service (refer to FIG. 27)

Referring to FIG. 29, wireless devices 100 and 200 may correspond to the wireless devices 100 and 200 of FIG. 28 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 28. For example, the transceiver(s) 114 may include the one or more transceivers 106 and 206 and/or the one or more antennas 108 and 208 of FIG. 28. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (**100*a* of FIG. 27), the vehicles (100*b*-1 and 100*b*-2 of FIG. 27), the XR device (100*c* of FIG. 27), the hand-held device (100*d* of FIG. 27), the home appliance (100*e* of FIG. 27), the IoT device (100*f* of FIG. 27), a digital broadcast terminal, a hologram device, a public safety device, an MTC device, a medicine device, a fintech device (or a finance device), a security device, a climate/environment device, the AI server/device (400 of FIG. 27), the BSs (200 of FIG. 27**), a network node, etc. The wireless device may be used in a mobile or fixed place according to a use—example/service.

In FIG. 29, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 30:
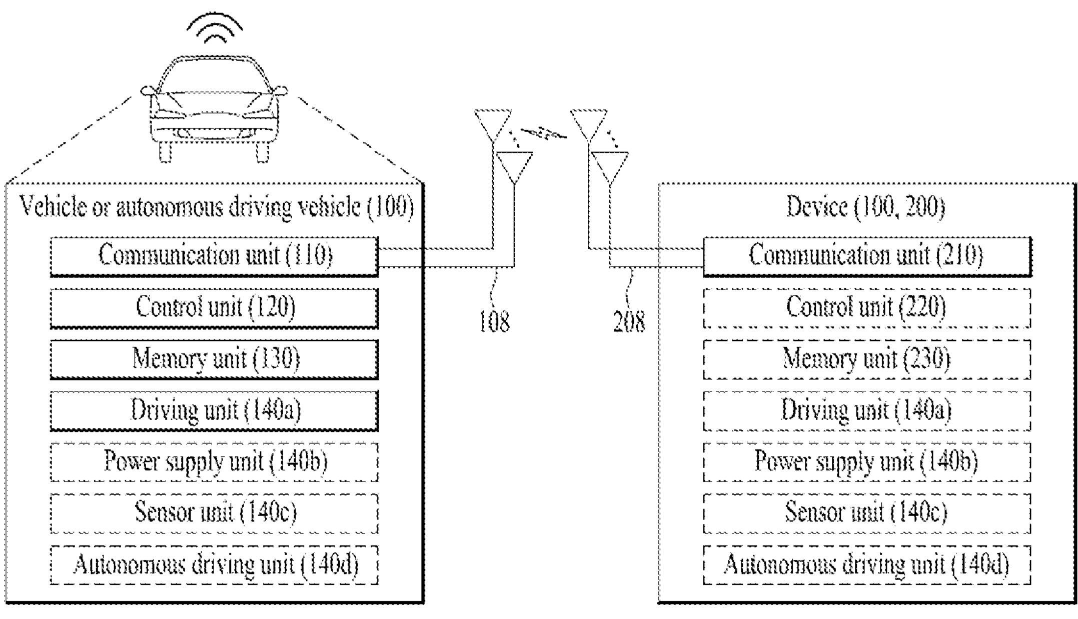
FIG. 30 illustrates a vehicle or an autonomous driving vehicle applied to the present disclosure.

Examples of Vehicles or Autonomous Vehicles to which the Present Disclosure is Applied FIG. 30 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 30, a vehicle or autonomous driving vehicle 100 may include an antenna unit 108, a communication unit 110, a control unit 120, a driving unit **140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 29**, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit **140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d*** may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the acquired data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network including a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), and Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:

1. A method of transmitting, by a first server, a server message to a second server in a wireless communication system, the method comprising:

receiving a first message including location information on a first user equipment (UE) from the first UE;

forwarding the first message which configures reception group as a first group to UEs corresponding to the first group; and transmitting the server message to the second server through a first connection, wherein the first connection is established based on a response message of the second server to a connection request message including conversion type information transmitted by the first server to the second server, wherein based on the conversion type information is a transmission conversion type, the first server converts the first group to a second group based on group type information included in the response message and transmits the server message including a second message for which reception group is converted to the second group through the first connection.

2. The method of claim 1, wherein based on the conversion type information is the transmission conversion type, the second message is converted from the first message based on transmission parameters for the second server included in the response message.

3. The method of claim 1, wherein the group type information includes information one of:

a first type for configuring a group based on a tile-shaped zone related to the location information;

a second type for configuring a group based on a road related to the location information; and a third type for configuring a group based on a UE identifier (ID) related to the UE.

4. The method of claim 3, wherein based on that the first group is configured based on the first type and that the group type information is the second type, the second group is configured on a first road mapped to a first zone related to the first group according to a mapping table between the zone and the road.

5. The method of claim 3, wherein based on that the first group is configured based on the third type and that the group type information is the second type, the second group is configured on a first road related to a location of the UE based on the location information on the UE and road information obtained in advance for the second type.

6. The method of claim 1, wherein the reception group for the second message is set to the second group by registering or changing a topic related to the second group in the first connection based on a message queuing telemetry transport (MQTT) protocol.

7. The method of claim 1, wherein the reception group for the second message is set to the second group through the first connection, and wherein the first connection is a transmission control protocol/Internet protocol (TCP/IP) connection established based on socket connection information on UEs included in the second group.

8. The method of claim 1, wherein the conversion type information includes information on any one of the transmission conversion type, a reception conversion type, and an integrated conversion type.

9. The method of claim 8, wherein based on that the conversion type information is the reception conversion type, the server message include the first message that is not converted.

10. The method of claim 8, further comprising, based on that the conversion type information is the reception conversion type, receiving a message requesting additional information required to configure the second message related to the second server from the second server.

11. The method of claim 8, wherein based on that the conversion type information is the integrated conversion type, the server message includes an integrated message converted from the first message based on integrated parameters in common between the first server and the second server.

12. The method of claim 1, wherein the server message is a server message based on intelligent transport system (ITS) information.

13. A method of receiving, by a second server, a server message from a first server in a wireless communication system, the method comprising:

receiving a second message including location information on a second user equipment (UE) from the second UE;

forwarding the second message which configures reception group as a second group to UEs corresponding to the first group; and receiving the server message from the first server through a first connection, wherein the first connection is established based on transmission of a response message in response to a connection request message including conversion type information received from the first server, and wherein based on the conversion type information is a transmission conversion type, a reception group for the server message is converted to the second group related to group type information included in the response message through the first connection.

14. The method of claim 13, further comprising, based on the conversion type information is a reception conversion type;

obtaining a first message included in the server message, wherein the first message is received by the first server from a first UE; and converting the first message to the second message.

15. The method of claim 14, wherein further comprising, based on that the first message does not include first information for the conversion to the second message, transmitting a request message to request the first information, wherein based on that the first information or part of the first information is not included in a request response message in response to the request message, the second server:

receives a collective perception service (CPS) message or a collective perception message (CPM); and obtains the first information or the part of the first information from object matching based on the CPS or the CPM.

16. A first server configured to transmit a server message to a second server in a wireless communication system, the first server comprising:

a radio frequency (RF) transceiver; and a processor connected to the RF transceiver, wherein the processor is configured to control the RF transceiver to:

receive a first message including location information on a first user equipment (UE) from the first UE;

forward the first message which configures reception group as a first group to UEs corresponding to the first group; and transmit the server message to the second server through a first connection, wherein the first connection is established based on a response message of the second server to a connection request message including conversion type information transmitted by the first server to the second server, wherein based on the conversion type information is a transmission conversion type, the processor is configured to:

convert the first group to a second group based on group type information included in the response message; and transmit the server message including a second message for which reception group is converted to the second group through the first connection.

* * * * *